US011657659B2

(12) United States Patent
Smith

(10) Patent No.: US 11,657,659 B2
(45) Date of Patent: *May 23, 2023

(54) SYSTEMS AND METHODS FOR ANALYZING WIRELESS TELEMATICS DATA OF A VEHICLE ENGAGED IN AN EXTENDED PERIOD OF TRAVEL

(71) Applicant: BlueOwl, LLC, San Francisco, CA (US)

(72) Inventor: Bennett Smith, Inver Grove Heights, MN (US)

(73) Assignee: BlueOwl, LLC, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/700,206

(22) Filed: Mar. 21, 2022

(65) Prior Publication Data

US 2022/0215696 A1    Jul. 7, 2022

Related U.S. Application Data

(63) Continuation of application No. 16/590,665, filed on Oct. 2, 2019, now Pat. No. 11,308,737.

(51) Int. Cl.
*G07C 5/00* (2006.01)
*H04W 4/44* (2018.01)
(Continued)

(52) U.S. Cl.
CPC ......... *G07C 5/008* (2013.01); *G06Q 30/0224* (2013.01); *G07C 5/085* (2013.01);
(Continued)

(58) Field of Classification Search
CPC ...... G07C 5/008; G07C 5/0825; G07C 5/085; G06Q 30/0224; H04W 4/023; H04W 4/027; H04W 4/44; B60W 50/14
See application file for complete search history.

(56) References Cited

U.S. PATENT DOCUMENTS 7,233,861 B2   6/2007 Van et al.
9,789,878 B2   10/2017 Lee et al.
(Continued)

FOREIGN PATENT DOCUMENTS

CN    103440767 B    9/2015

OTHER PUBLICATIONS

Roadtrippers, "Are you ready to take your road trip to the next level?" retrieved from the Internet at <https://roadtrippers.com/rtplus-comparison/>(May 2019).

*Primary Examiner* — James J Yang
(74) *Attorney, Agent, or Firm* — Faegre Drinker Biddle & Reath LLP

(57) ABSTRACT

A system for analyzing wireless telematics data to determine that a vehicle is engaged in an extended period of travel and prompt additional devices within the vehicle regarding the extended period of travel. The system may comprise a telematics server and a plurality of mobile applications to be implemented on a plurality of telematics devices belonging to a plurality of users. The plurality of telematics devices transmit telematics data to the telematics server. The data is analyzed and the telematics server transmits an indication to the telematics devices, causing the mobile applications to execute in a driver application mode or passenger application mode. Messages containing notifications to change drivers or pull over are sent to the telematics devices.

20 Claims, 10 Drawing Sheets

(51) Int. Cl.
*H04W 4/02* (2018.01)
*G07C 5/08* (2006.01)
*G06Q 30/0207* (2023.01)

(52) U.S. Cl.
CPC .......... *G07C 5/0825* (2013.01); *H04W 4/023* (2013.01); *H04W 4/027* (2013.01); *H04W 4/44* (2018.02)

(56) References Cited

U.S. PATENT DOCUMENTS

| | | |
|---|---|---|
| 10,145,702 B2 | 12/2018 | Gerlach |
| 11,054,261 B1 * | 7/2021 | Kanevsky .............. G07C 5/085 |
| 11,055,785 B1 * | 7/2021 | Lundsgaard ........... G06Q 40/08 |
| 2010/0153008 A1 | 6/2010 | Schwartz et al. |
| 2017/0154394 A1 | 6/2017 | Kan et al. |
| 2017/0263120 A1 * | 9/2017 | Durie, Jr. ............... G08G 1/205 |

* cited by examiner

SYSTEMS AND METHODS FOR ANALYZING WIRELESS TELEMATICS DATA OF A VEHICLE ENGAGED IN AN EXTENDED PERIOD OF TRAVEL

This application is a continuation of U.S. patent application Ser. No. 16/590,665, filed Oct. 2, 2019, incorporated by reference herein for all purposes.

FIELD OF THE DISCLOSURE

The present disclosure generally relates to vehicular telematics systems and methods, and more particularly to vehicular telematics systems and methods for analyzing wireless telematics data of a vehicle engaged in an extended period of travel and for communicating with wireless telematics devices within the vehicle regarding the extended period of travel.

BACKGROUND

Telematics information regarding operation of passenger vehicles may generally be collected for vehicle trips. The collected telematics data can be used in monitoring a vehicle along a route or trip.

Generally, vehicle trips over long distances are detrimental for both the driver of a vehicle, and those occupants of other vehicles in the vicinity of the vehicle. Problems can arise when the driver engaged in an long distance trip faces fatigue, especially where distractions, whether internal or external to the vehicle, may interrupt the driver's attention and focus on operating the vehicle. While telematics information may be useful for tracking a driver's route over time, a problem arises regarding the use of the telematics information, such as supplying telematics-based information to an already fatigued driver, which can result in a further distraction to the driver.

For the foregoing reasons, there is a need for vehicular telematics systems and methods for analyzing wireless telematics data of a vehicle engaged in an extended period of travel and for communicating with wireless telematics devices within the vehicle regarding the extended period of travel. These vehicular telematics systems and methods for such are disclosed herein.

SUMMARY

The disclosure of the present application provides solutions to determine when a driver is engaged with an extended road trip, and thus is more likely to suffer from fatigue. In addition, the disclosure of the present application further provides solutions that prompt and incentivize a driver to take a temporary break from driving, such as by offering promotional deals for various rest stops or by prompting another driver present in the vehicle to take over for the first driver.

The disclosure of the present application generally describes vehicular telematics data, as used for extended vehicle trips. In the manner described herein, this data can often indicate that drivers are pushing beyond safe limits in an effort to reach their respective destinations, which causes wheel fatigue. This wheel fatigue diminishes reaction times and increases the likelihood of a driver being involved in an accident, thus leading to increased risks of injury or death.

While attempts have been made to solve this problem in the past, it remains an ever-present risk to drivers, particularly on longer road trips. As such, the embodiments of the present disclosure describe systems and methods to minimize and mitigate the fatigue of drivers during road trips. For example, in various embodiments, the systems and methods described herein, through the technical systems described, provide notifications to mobile devices of passengers within the vehicle to promote safe driving (e.g., to take breaks, allow others to drive, etc.) on extended vehicle trips.

Accordingly, as described herein, in various embodiments, the vehicular telematics systems and methods may include a telematics server configured to receive telematics data from a plurality of wireless telematics devices.

The telematics systems and methods may further include a first mobile application or first set of program instructions implemented on a first telematics device of a first user. The first mobile application or first set of program instructions may be communicatively and wirelessly coupled to the telematics server. The first telematics device may travel with the vehicle and may be in a first proximity of the first user.

The telematics system may further include a second mobile application or second set of program instructions implemented on a second telematics device of a second user. The second mobile application or second set of program instructions may be communicatively and wirelessly coupled to the telematics server. The second telematics device may travel with the vehicle and may be in a second proximity of the second user. The second proximity may be different from the first proximity.

In various embodiments, the first mobile application or first set of program instructions may be wirelessly and communicatively coupled to the second mobile application or second set of program instructions. In further embodiments, the first set of program instructions on the first telematics device and the second set of program instructions on the second telematics device are a common set of program instructions. In additional embodiments, the first mobile application may execute a common set of program instructions as the second mobile application.

By way of example, in particular embodiments, the first mobile application or first set of program instructions may be configured to execute the program instructions on a processor of the first telematics device to: (i) wirelessly transmit, from a first transceiver of the first telematics device, a first series of telematics data to the telematics server, wherein the telematics server determines, based on the first series of telematics data, that the first user operates the vehicle during a first portion of a vehicle trip, (ii) receive, from the telematics server, a first indication that the first user operates the vehicle, the first indication causing the first mobile application or first set of program instructions to execute in a driver application mode, and (iii) receive, in the driver application mode at the first telematics device, one or more messages from the telematics server regarding a first duration of the first portion of the vehicle trip.

In a particular embodiment, the second mobile application or second set of program instructions may be configured to execute the program instructions on a processor of the second telematics device to: (i) wirelessly transmit, from a second transceiver of the second telematics device, a second series of telematics data to the telematics server, wherein the telematics server determines, based on the second series of telematics data, that the second user does not operate the vehicle during the first portion of the vehicle trip, (ii) receive, from the telematics server, a second indication that the second user does not operate the vehicle, the second indication causing the second mobile application or second set of program instructions to execute in a passenger application mode, (iii) receive, from the first mobile application or second set of program instructions through the first transceiver of the first telematics device while in the passenger application mode, the one or more messages, and (iv) render the one or more messages on a display of the second telematics device.

In certain embodiments, at least one message of the one or more messages causes the display of the second device to display an electronic notification indicating that the second user operate the vehicle during a second portion of the vehicle trip.

In further embodiments, the telematics system may determine the number of potential drivers by determining that the distance of the second proximity of the second user to the first proximity of the first user is below a predetermined threshold.

In another embodiment, the first mobile application or first set of program instructions may be configured to wirelessly transmit, from the first transceiver of the first telematics device, the first series of telematics data to the telematics server after exiting the driver application mode.

By way of example, the first mobile application or first set of program instructions is configured to exit the driver application mode after a speed associated with the first telematics device is determined to be below a threshold value of 10 mph for a period of at least 5 minutes.

In several embodiments, the vehicle is determined to be engaged in an extended period of travel when a predetermined trip threshold is reached.

At least one message of the one or more messages may cause the display of the second device to display a recommendation or a discount associated with predicted locations along a predicted route of the vehicle trip.

At least one message of the one or more messages may also cause the display of the second device to display an estimated time at which the second user should allow the first user to resume operation of the vehicle during a third portion of the vehicle trip.

In some embodiments, the first mobile application may include the first set of program instructions as described herein. Similarly, the second mobile application may include the second set of program instructions as described herein.

In additional embodiments, a telematics method includes receiving, at a telematics server, telematics data from a plurality of wireless devices. The telematics method further may include determining that a first telematics device is traveling with the vehicle and in a first proximity to a first user and determining that a second telematics device is traveling with the vehicle and in a second proximity to a second user, the second proximity different from the first proximity.

In some embodiments, the telematics method may further include a first set of program instructions on the first telematics device and a second set of program instructions on the second telematics device. In additional embodiments, both sets of program instructions may be a common set of program instructions but executed by respective first and second mobile applications and devices.

In certain embodiments, the program instructions of the disclosed telematics method may include instructions to wirelessly transmit, from a first transceiver of the first telematics device, a first series of telematics data to the telematics server, wherein the telematics server determines, based on the first series of telematics data, that the first user operates the vehicle during a first portion of a vehicle trip. The program instructions of the disclosed telematics method may further include instructions to receive, from the telematics server, a first indication that the first user operates the vehicle, the first indication causing the first mobile application or first set of program instructions to execute in a driver application mode. The program instructions may also include instructions to receive, in the driver application mode at the first telematics device, one or more messages from the telematics server regarding a first duration of the first portion of the vehicle trip.

In some embodiments, the telematics method may include executing, via the second mobile application or second set of program instructions and on a processor of the second telematics device, program instructions. The program instructions may include instructions to wirelessly transmit, from a second transceiver of the second telematics device, a second series of telematics data to the telematics server, wherein the telematics server determines, based on the second series of telematics data, that the second user does not operate the vehicle during the first portion of the vehicle trip. The program instructions may further include instructions to receive, from the telematics server, a second indication that the second user does not operate the vehicle, the second indication causing the second mobile application or second set of program instructions to execute in a passenger application mode. The program instructions may also include instructions to receive, from the first mobile application or first set of program instructions through the first transceiver of the first telematics device while in the passenger application mode, the one or more messages, and render the one or more messages on a display of the second telematics device.

In certain embodiments, the telematics method may include displaying, via at least one message of the one or more messages and on the display of the second device, an electronic notification indicating that the second user operate the vehicle during a second portion of the vehicle trip.

The telematics method may include determining the number of potential drivers by determining the distance of the second proximity of the second user to the first proximity of the first user.

The telematics method may further include the first mobile application or first set of program instructions wirelessly transmitting, from the first transceiver of the first telematics device, the first series of telematics data to the telematics server after exiting the driver application mode.

In some embodiments, the first mobile application or first set of program instructions is configured to exit the driver application mode after a speed associated with the first telematics device is determined to be below a threshold value of 10 mph for a period of at least 5 minutes.

The telematics method may determine that the vehicle is engaged in an extended period of travel when a predetermined trip threshold is reached.

In certain embodiments, the telematics method may cause at least one message of the one or more messages to cause the display of the second device to display a recommendation or discount associated with predicted locations along a predicted route of the vehicle trip.

In some embodiments, the telematics method may cause at least one message of the one or more messages to cause the display of the second device to display an estimated time at which the second user should allow the first user to resume operation of the vehicle during a third portion of the vehicle trip.

Additional embodiments include a tangible, non-transitory computer-readable medium storing instructions that, when executed by one or more processors of a computing device, the computing device including one or more memories, cause the computing device to receive, at a telematics server, telematics data from a plurality of wireless devices.

The computer-readable medium may further store instructions that cause the computing device to determine that a first telematics device is traveling with the vehicle and in a first proximity to a first user. In certain embodiments, the instructions may cause the computing device to determine that a second telematics device is traveling with the vehicle and in a second proximity to a second user, the second proximity different from the first proximity. The instructions may also cause the computing device to execute, on a first and second mobile application, a common set of program instructions, where the first and second mobile applications are copies of the same program instructions or code installed on each of the first telematics device and the first telematics device, respectively.

In certain embodiments, the computer-readable medium may store instructions that cause the computing device to execute, via the first mobile application and on a processor of the first telematics device, program instructions to: (i) wirelessly transmit, from a first transceiver of the first telematics device, a first series of telematics data to the telematics server, wherein the telematics server determines, based on the first series of telematics data, that the first user operates the vehicle during a first portion of a vehicle trip, (ii) receive, from the telematics server, a first indication that the first user operates the vehicle, the first indication causing the first mobile application to execute in a driver application mode, and (iii) receive, in the driver application mode at the first telematics device, one or more messages from the telematics server regarding a first duration of the first portion of the vehicle trip.

In some embodiments, the computer-readable medium may store instructions that cause the computing device to execute, via the second mobile application and on a processor of the second telematics device, program instructions to: (i) wirelessly transmit, from a second transceiver of the second telematics device, a second series of telematics data to the telematics server, wherein the telematics server determines, based on the second series of telematics data, that the second user does not operate the vehicle during the first portion of the vehicle trip, (ii) receive, from the telematics server, a second indication that the second user does not operate the vehicle, the second indication causing the second mobile application to execute in a passenger application mode, (iii) receive, from the first mobile application through the first transceiver of the first telematics device while in the passenger application mode, the one or more messages, and (iv) render the one or more messages on a display of the second telematics device.

The computer-readable medium may store instructions that cause the computing device to display, via at least one message of the one or more messages and on the display of the second device, an electronic notification indicating that the second user operate the vehicle during a second portion of the vehicle trip.

The computer-readable medium may also store instructions that cause the computing device to determine the number of potential drivers by determining the distance of the second proximity of the second user to the first proximity of the first user.

The computer-readable medium may further store instructions that cause the computing device to transmit, from the first transceiver of the first telematics device, the first series of telematics data to the telematics server after exiting the driver application mode.

By way of example, in some embodiments the computer-readable medium may store instructions that cause the computing device to exit the driver application mode after a speed associated with the first telematics device is determined to be below a threshold value of 10 mph for a period of at least 5 minutes.

The computer-readable medium may store instructions that cause the computing device to determine that the vehicle is engaged in an extended period of travel when a predetermined trip threshold is reached.

The computer-readable medium may further store instructions that cause the computing device to cause at least one message of the one or more messages to cause the display of the second device to display an estimated time at which the second user should allow the first user to resume operation of the vehicle during a third portion of the vehicle trip.

Determining by way of a telematics device and telematics sensors that a driver has spent an excessive amount of time driving and subsequently prompting additional users in the same vehicle to take control provides a solution with multiple benefits. In particular, it allows for safer transitions than other potential solutions. Both automatically determining that a driver has been driving for too long and delivering messages to other users in the same vehicle allows for the system to address concerns about wheel fatigue without further distracting the driver. When a driver is already fatigued, prompting her to taker her eyes off of the road has the potential to be just as dangerous as allowing her to continue.

Further, it is more difficult for a user to ignore the automatic sensing of driving time and/or distance as well as prompting another potential driver. In past solutions, a driver could easily ignore prompts to input information or to pull over, allowing the problem of wheel fatigue to continue unabated. The present implementation, however, allows for an approach that is more difficult to ignore.

In addition, the present disclosure describes systems and methods of collecting telematics data from telematics devices at a remote server, where the remote server performs analytics on the telematics data for the purpose of determining or generating messages, based on travel distance, timing, etc. as described herein. Such remote processing improves the operation of the telematics devices because the telematics devices are able to offload the computationally expensive tasks of telematics data analysis of numerous telematics data records (which involve processor time and memory resources) to the remote server. This frees the telematics devices from the need of performing such computational tasks and additionally allows the telematics devices to engage in further use as battery or power consumption is minimized.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

The Figures depict preferred embodiments for purposes of illustration only. Alternative embodiments of the systems and methods illustrated herein may be employed without departing from the principles of the invention described herein.

DETAILED DESCRIPTION

Figure 1A:
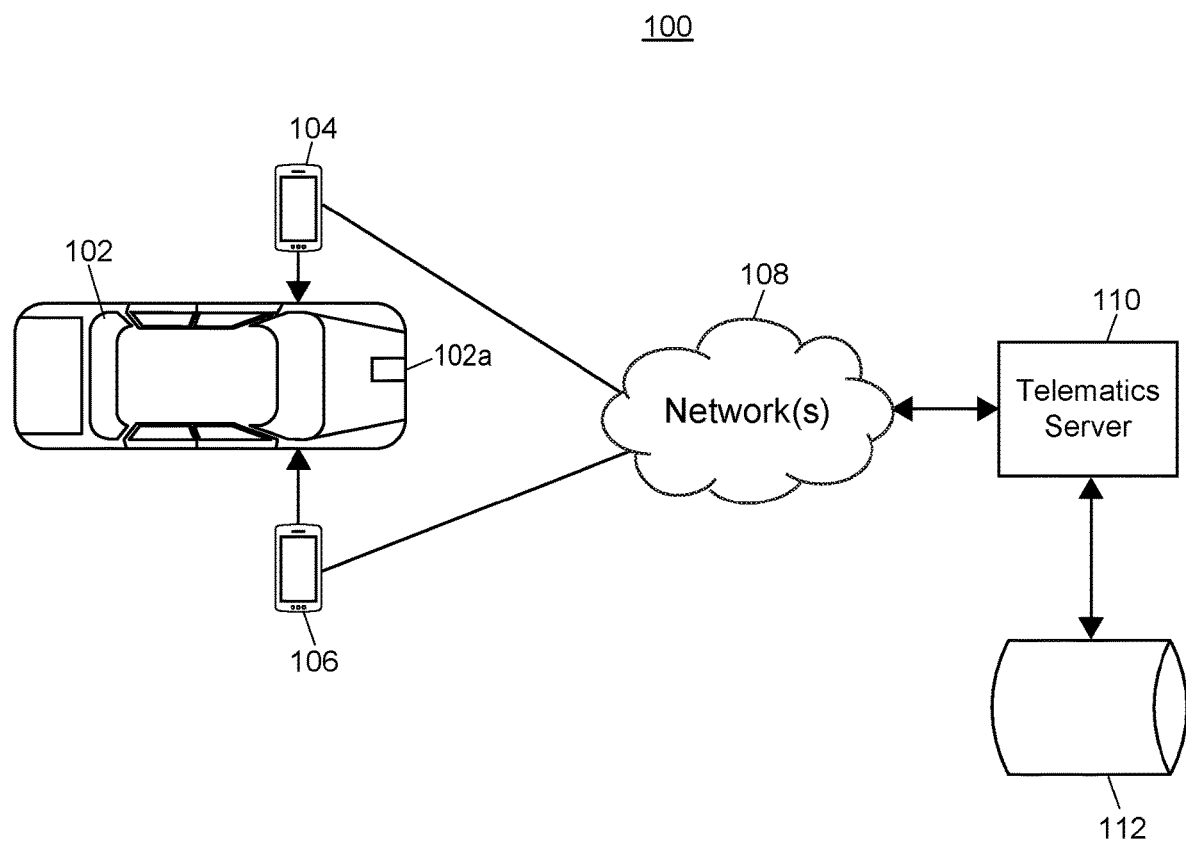
FIG. 1A illustrates an embodiment of an example vehicular telematics system configured to receive vehicular telematics data from a one or more telematics devices onboard a vehicle in accordance with various embodiments disclosed herein.

FIG. 1A represents an embodiment of an example vehicular telematics system 100 configured to receive vehicular telematics data from a one or more telematics devices 104/106 onboard a vehicle 102 in accordance with various embodiments disclosed herein. In particular, FIG. 1A illustrates a telematics server 110 configured to receive vehicular telematics data from one or more telematics devices, such as a first telematics device 104 and/or a second telematics device 106 onboard a vehicle 102.

As the term is used herein, "telematics data" may include vehicle specific data, sensor data, and/or vehicle environment related data that is generated, collected, monitored, measured, transmitted, and/or otherwise manipulated by one or more telematics devices 104/106 or sensors 102a associated with a vehicle 102. The telematics data may include various metrics that indicate the direction, speed, acceleration, braking, cornering, and/or motion of the vehicle in which the data is associated. The telematics data may further include various metrics that indicate such characteristics of individual users within the vehicle, including walking speed, stride length, and other movement data. The telematics data may also include geographic position information defining a geographic location of a telematics device associated with a vehicle. Such data may include latitude and longitude coordinates, for example. The telematics data may further include time value of the geographic position information, defining a specific point in time the telematics device was at a given geographic location. Such data may be determined from a mobile telematics device traveling within a proximity of the user, or any other such device described herein.

Generally, telematics system 100 may include both hardware and software components, where software components may execute on the hardware devices. Telematics system 100 may communicate via various data communication channels for communicating data between and among the various components. It should be appreciated that telematics system 100 is merely an example and that alternative or additional components are envisioned.

As illustrated in FIG. 1A, telematics system 100 may include a vehicle 102 which may be, for example, an automobile, a car, a truck, a tow truck, a snowplow, a boat, a motorcycle, a motorbike, a recreational vehicle, or any other type of vehicle capable of roadway or other travel with at least one passenger. First telematics device 104 and second telematics device 106 may generally be computing devices capable of performing various functionalities relating to vehicular telematics data generation, collection, and/or transmission. For example, in some embodiments, first telematics device 104 and second telematics device 106 may be mobile cellphones, or may be specialized telematics collection devices. First telematics device 104 and second telematics device 106 may be any type of electronic device such as a smartphone, notebook computer, tablet, "phablet," GPS (Global Positioning System) or GPS-enabled device, smart watch, smart glasses, smart bracelet, wearable electronic, PDA (personal digital assistants), pager, computing device configured for wireless communication, and/or the like.

First telematics device 104 and second telematics device 106 may implement one or more mobile operation systems, such as APPLE IOS or GOOGLE ANDROID. First telematics device 104 and second telematics device 106 may be equipped or configured with a set of sensors, such as a location module (e.g., a GPS chip), an image sensor, an accelerometer, a clock, a gyroscope, a compass, a yaw rate sensor, a tilt sensor, and/or other sensors. In FIG. 1A, although only a first and second telematics device are depicted, it should be understood that, in some embodiments, a plurality of first telematics device 104 and second telematics device 106 may be used.

The on-board sensor(s), such as 102a, may communicate additional telematics data to the first telematics device 104 and second telematics device 106. This telematics data may be processed, generated, and/or collected using sensors 102a to determine when vehicle 102 is in operation as well as determine information regarding operation of vehicle 102.

In other embodiments, the telematics system may use first telematics device 104 or second telematics device 106 to determine when vehicle 102 is in operation as well as determine information regarding operation of vehicle 102. In some situations, sensors 102a may communicate to telematics devices 104/106 respective telematics data indicative of the environment in which vehicle 102 is operating. For example, first telematics device 104 and second telematics device 106 may additionally be configured to obtain geographic location data and/or telematics data by communicating with sensors 102a. In some embodiments, telematics server 110 may obtain geographic location data via communication with a vehicle-integrated global navigation satellite system (GNSS), GPS, etc. To provide additional examples, telematics server 110 may obtain one or more metrics related to the speed, direction, and/or motion of vehicle 102 via any number of suitable sensors (e.g., sensors 102a), which can include speedometer sensors, braking sensors, airbag deployment sensors, crash detection sensors, accelerometers, etc.

According to embodiments, the sensors 102a or may include one or more of a GPS unit, a radar unit, a LIDAR unit, an ultrasonic sensor, an infrared sensor, some other type of electromagnetic energy sensor, a microphone (e.g., to support detect/listen for audio/sound wave of siren(s) associated with an emergency vehicle), a radio (e.g., to support wireless emergency alerts or an emergency alert system), an inductance sensor, a camera, an accelerometer, an odometer, a system clock, a gyroscope, a compass, a geo-location or geo-positioning unit, a location tracking sensor, a proximity sensor, a tachometer, a speedometer, and/or the like. Some of the sensors 102a or 132 (e.g., GPS, accelerometer, or tachometer units) may provide telematics data indicative of, for example, the vehicle's 102 location, speed, position acceleration, direction, responsiveness to controls, movement, etc.

Other sensors 102a may be directed to the interior or passenger compartment of vehicle 108, such as cameras, microphones, pressure sensors, weight sensors, thermometers, or similar sensors to monitor any passengers, operations of instruments included in vehicle 102, operational behaviors of vehicle 102, and/or conditions within vehicle 102. For example, on-board sensors 102a directed to the interior of vehicle 108 may provide telematics data indicative of, for example, in-cabin temperatures, in-cabin noise levels, data from seat sensors (e.g., indicative of whether or not an individual is using a seat, and thus the number of passengers being transported by vehicle 102), data from seat belt sensors, data regarding the operations of user controlled devices such as windshield wipers, defrosters, traction control, mirror adjustment, interactions with on-board user interfaces, etc. Additionally, the on-board sensors 102a may further detect and monitor the health of the occupant(s) of vehicle 102 (e.g., blood pressure, heart rate, blood sugar, temperature, etc.).

In various embodiments of telematics system 100, first telematics device 104 and second telematics device 106 may communicate with telematics server 110 (e.g., via a network(s) 108). In particular, at least one of first telematics device 104 or second telematics device 106 may communicate with telematics server 110 via the network(s) 108 to enable telematics server 110 to receive and/or store generated telematics data and information regarding usage of vehicle 102.

The network(s) 108 may include a proprietary network, a secure public internet, a virtual private network, and/or some other type of network, such as dedicated access lines, plain ordinary telephone lines, satellite links, cellular data networks, combinations of these and/or other types of networks. The network(s) 108 may utilize one or more radio frequency communication links to communicatively connect to vehicle 102, e.g., utilize wireless communication link(s) to communicatively connect with first telematics device 104 and second telematics device 106. Where the network(s) 108 comprises the Internet or other data packet network, data communications may take place over the network(s) 108 via an Internet or other suitable data packet communication protocol. In some arrangements, the network(s) 108 additionally or alternatively includes one or more wired communication links or networks.

Telematics server 110 includes one or more servers or computing devices, which may be implemented as a server bank/server farm, or cloud computing platform. Telematics server 110 may include one or more computer processors adapted and configured to execute various software applications and components of telematics system 100, in addition to other software components, as described herein.

Telematics server 110 may further include or be communicatively connected to one or more data storage devices 112 (e.g., databases), which may be adapted to store telematics data related to the operation of vehicle 102, or GUI value data that is determined from telematics data, as described herein. For example, the one or more data storage devices 112 may be implemented as a data bank or a cloud data storage system, at least a portion of which may be locally accessed by telematics server 110 using a local access mechanism such as a function call or database access mechanism (e.g., SQL), and/or at least a portion of which may be remotely accessed by telematics server 110 using a remote access mechanism such as a communication protocol. Telematics server 110 may access data stored in the one or more data storage devices 112 when executing various functions and tasks associated with the present disclosure, including for example, receiving telematics data from first telematics device 104 and/or second telematics device 106, and/or transmitting GUI values to a telematics mobile app as described herein.

Database 112 may further be any system, entity, repository, or the like, capable of obtaining and storing data, processing data, or returning values or data associated with vehicle operation as described herein. In some embodiments, the database(s) 112 may store or process data indicative of vehicle operation regulations. For example, the database 112 may store speed limit information, direction of travel information, lane information, map information, route information, and/or similar information. The database 112 may also maintain or obtain real-time data indicative of traffic signals for roadways (e.g., which traffic signals currently have red lights or green lights). Further, the database 112 may also store saved data on the first or second user, referred to as "past user history".

Past user history may include data input by the first or second user via the first mobile telematics device 104 or second mobile telematics device 106. Past user history may also include data input by the first or second user via another computing device (not shown) onboard the vehicle 102. In some embodiments, past user history may be gathered by telematics devices 104/106 and include information such as average stride length, average walking speed, maximum walking speed, average time spent driving, and other similar data. In certain embodiments, past user history may further be gathered by vehicle sensor(s) 102a and may include information such as average driving speed, past trip lengths, past trip dates, past trip locations, past trip routes, most commonly driven routes, user weight, user height, past user driving decisions, and other similar data.

The first set of program instructions on the first telematics device 104 may comprise, or may be part of, a mobile application, generally comprised of software or firmware, or other similar instructions or computer code as described herein. Similarly, The second set of program instructions on the second telematics device 106 may comprise, or may be part of, a mobile application, generally comprised of software or firmware, or other similar instructions or computer code as described herein.

Figure 1B:
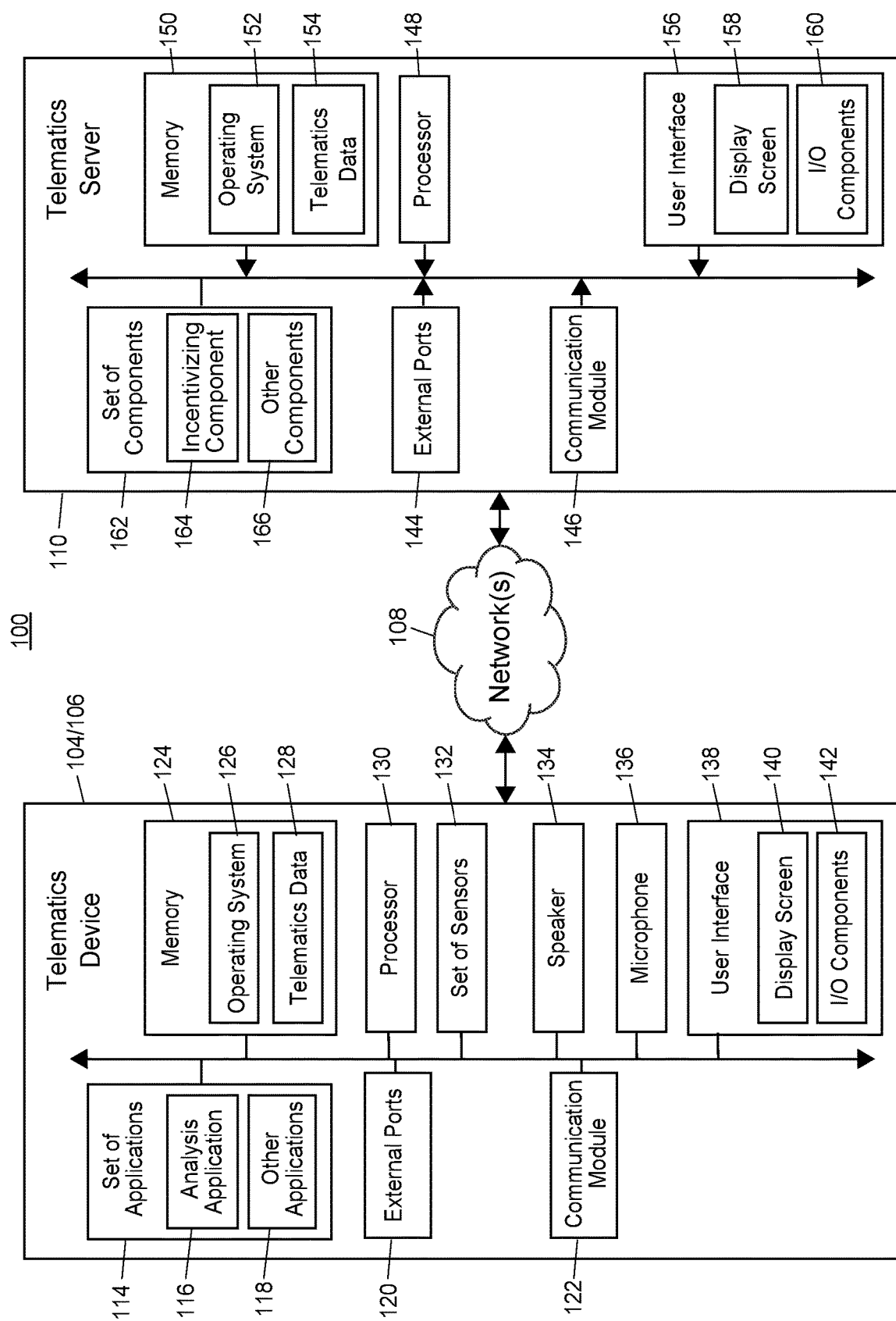
FIG. 1B illustrates a block diagram of the vehicular telematics system, telematics server, and the telematics devices of FIG. 1A in accordance with various embodiments disclosed herein.

FIG. 1B illustrates a block diagram of the vehicular telematics system 100, telematics server 110 and the telematics devices 104/106 of FIG. 1A in accordance with various embodiments disclosed herein. It should be realized that, at least in some embodiments, a second telematics device 106 may look and function in the same or similar manner as the first telematics device 104. In other embodiments, a second telematics device 106 may look and function differently from the first telematics device 104.

Accordingly, either one or both of first telematics device 104 or second telematics device 106 may communicate (e.g., send telematics data) via network(s) 108 over the link(s). Additionally, in some configurations, first telematics device 104 and second telematics device 106 may communicate with one another directly over a wireless or wired link. first telematics device 104 and/or second telematics device 106 disposed at vehicle 102 may communicate via the network(s) 108 and the communication component(s) 122 by using one or more suitable wireless communication protocols (e.g., GSM, CDMA, LTE, one or more IEEE 802.11 Standards such as Wi-Fi, WiMAX, BLUETOOTH, etc.).

In the embodiment of FIG. 1B, the first telematics device 104 may include a processor 130 as well as a memory 124. Memory 124 may store an operating system 126 capable of facilitating the functionalities as discussed herein as well as a set of applications 114 (i.e., machine readable instructions). For example, one of the set of applications 114 may be an analysis application 116 configured to facilitate several of the functionalities as discussed herein. It should be appreciated that one or more other applications 118 are envisioned, such as an application for generating, collecting, monitoring, measuring, and/or transmitting telematics data via telematics device 104 as described herein.

Processor 130 may interface with the memory 124 to execute the operating system 126 and the set of applications 114. According to some embodiments, the memory 124 may also include telematics data 128 including data accessed or generated from a set of sensors (e.g., sensors 102a) or directly via a telematics device (e.g., first telematics device 104 or second telematics device 106). The memory 124 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

To communicate with telematics server 110, first telematics device 104 and second telematics device 106 may include a communication module(s) 122 (also referred to herein as "communication components") that are configured to transmit information to and receive information from telematics server 110. The communication components 122 may include one or more wireless transmitters or transceivers operating at any desired or suitable frequency or frequencies.

Wireless transmitters or transceivers may operate at different frequencies and/or by using different protocols, if desired. In an example, first telematics device 104 may include a respective communication component 122 for sending or receiving information to and from telematics server 110 via the network(s) 108, such as over one or more radio frequency links or wireless communication channels which support a first communication protocol (e.g., GSM, CDMA, LTE, one or more IEEE 802.11 standards such as Wi-Fi, WiMAX, BLUETOOTH, etc.). Additionally or alternatively, first telematics device 104 may operate in conjunction with an on-board transceiver or transmitter that is disposed at vehicle 102 as described for FIG. 1A herein (which may, for example, be fixedly attached to vehicle 102) for sending or receiving information to and from telematics server 110 via the network(s) 108, such as over one or more radio frequency links or wireless communication channels which support the first communication protocol and/or a second communication protocol.

According to some embodiments, the communication module 122 may include one or more transceivers (e.g., WWAN, WLAN, and/or WPAN transceivers) functioning in accordance with IEEE standards, 3GPP standards, or other standards, and configured to receive and transmit data via one or more external ports 120. For example, the communication module 122 may interface with another device, component, or sensors via the network(s) 108 to retrieve sensor data.

In some embodiments, first telematics device 104 may include a set of sensors 132 such as, for example, a location module (e.g., a GPS chip), an image sensor, an accelerometer, a clock, a gyroscope, a compass, a yaw rate sensor, a tilt sensor, telematics sensors, and/or other sensors. First telematics device 104 may further include user interface 138 configured to present information to a user and/or receive inputs from the user. As shown in FIG. 1A, the user interface 138 may include a display screen 140 and I/O components 142 (e.g., ports, capacitive or resistive touch sensitive input panels, keys, buttons, lights, LEDs). According to some embodiments, the user may access first telematics device 104 via the user interface 138 (e.g., a guided user interface (GUI)) to review information, make selections, and/or perform other functions. Additionally, first telematics device 104 may include a speaker 134 configured to output audio data and a microphone 136 configured to detect audio.

In some embodiments, first telematics device 104 may perform the functionalities as discussed herein as part of a "cloud" network (e.g., via network(s) 108 and telematics server 110) or may otherwise communicate with other hardware devices or software components within the cloud to send, retrieve, or otherwise analyze data. In some embodiments, telematics server 110 may operate as a Software-as-a-Service (SaaS) or Platform-as-a-Service (Paas), providing the functionality of telematics server 110 remotely to software apps and other components in accordance with the various embodiments described herein.

As illustrated in FIGS. 1A and 1B, first telematics device 104 may communicate and interface with telematics server 110 via the network(s) 108. Telematics server 110 may include a processor 148 as well as a memory 150. The memory 150 may store an operating system 152 capable of facilitating the functionalities as discussed herein as well as a set of components 151 (i.e., machine readable instructions). For example, one of the set of components 162 may include incentivizing component 164 configured to facilitate several of the functionalities discussed herein. It should be appreciated that one or more other components 166 are envisioned.

The processor 148 may interface with the memory 150 to execute the operating system 152 and the set of components 162. According to some embodiments, the memory 150 may also include telematics data 154, such as telematics data received from first telematics device 104, and/or other data as described herein. The memory 150 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

Telematics server 110 may further include a communication module 146 configured to communicate data via the one or more networks 108. According to some embodiments, the communication module 146 may include one or more transceivers (e.g., WWAN, WLAN, and/or WPAN transceivers) functioning in accordance with IEEE standards, 3GPP standards, or other standards, and configured to receive and transmit data via one or more external ports 144. For example, the communication module 146 may receive, from first telematics device 104, a set(s) of sensor data.

Telematics server 110 may further include user interface 156 configured to present information to a user and/or receive inputs from the user. As shown in FIG. 1A, the user interface 156 may include a display screen 158 and I/O components 160 (e.g., ports, capacitive or resistive touch sensitive input panels, keys, buttons, lights, LEDs). According to some embodiments, the user may access telematics server 110 via the user interface 156 to review information, make changes, input training data, and/or perform other functions.

In some embodiments, telematics server 110 may perform the functionalities as discussed herein as part of a "cloud" network or may otherwise communicate with other hardware or software components within the cloud to send, retrieve, or otherwise analyze data.

In general, a computer program product in accordance with any embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processors 130, 144 (e.g., working in connection with the respective operating systems 126, 152) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Swift, JavaScript, CSS, XML). In some embodiments, the computer program product may be part of a cloud network of resources.

Figure 2:
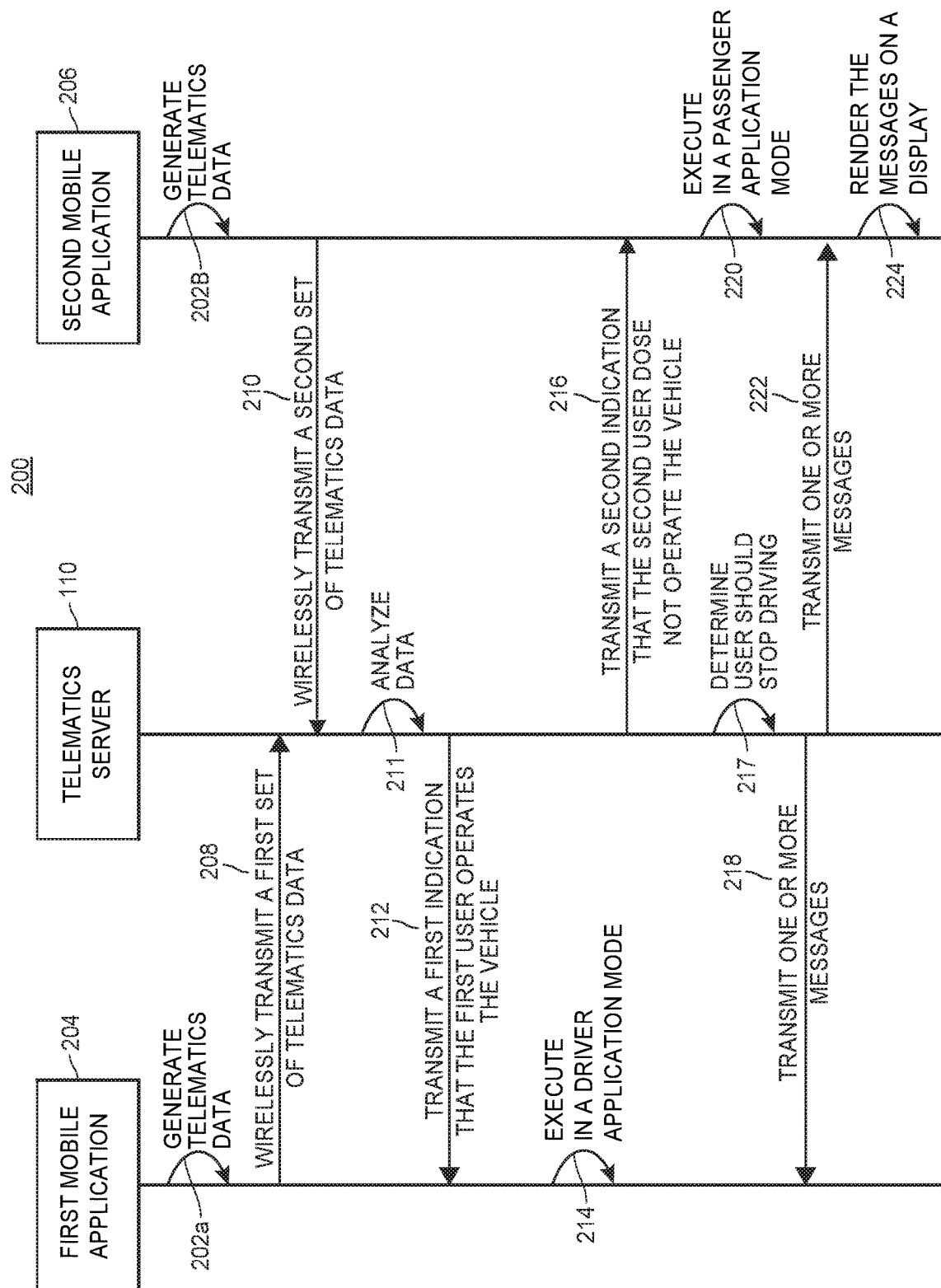
FIG. 2 illustrates a data transmission and implementation diagram of the example vehicular telematics system of FIG. 1A for analyzing telematics data of a vehicle engaged in an extended period of travel and for communicating with wireless telematics devices within the vehicle regarding the extended period of travel accordance with various embodiments disclosed herein.

FIG. 2 illustrates a data transmission and implementation diagram of an example vehicular telematics system 200 of FIG. 1A for analyzing telematics data of a vehicle engaged in an extended period of travel and for communicating with wireless telematics devices within the vehicle regarding the extended period of travel in accordance with various embodiments herein. Vehicular telematics system 200 may include all, or part, of the computing devices, features, and/or other functionality as described herein for FIGS. 1A and 1B. Accordingly, the disclosure for FIGS. 1A and 1B applies the same or similarly for FIG. 2. In particular, vehicular telematics system 200 includes first mobile application 204 and second mobile application 206 operating on first telematics device 104 and second telematics device 106 as well as telematics server 110, each as described herein with respect to FIGS. 1A and 1B.

In the embodiment of FIG. 2, first telematics device 104, executing first mobile application 204, generates telematics data (202a) associated with operation of a vehicle during one or more vehicle trips of the vehicle. This telematics data may be generated via sensors on the car 102a, via sensors in the telematics device 132, via GPS, systems, or via other systems or components as described herein for FIGS. 1A and 1B. Further, in the embodiment of FIG. 2, first mobile application 204 runs on first telematics device 104 and second mobile application 206 runs on second telematics device 206.

In some embodiments, first mobile application 204 on first telematics device 104 is communicatively and wirelessly coupled to the telematics server. In further embodiments, second mobile application 206 on second telematics device 106 is communicatively and wirelessly coupled to the telematics server. In the embodiment of FIG. 2, first mobile application 204 on first telematics device 104 is communicatively and wirelessly coupled to second mobile application 206 on second telematics device 106. The first mobile application 204 executes a common set of program instructions to the second mobile application 106.

After the first mobile application 204 on the first telematics device 104 generates telematics data (202a), it is then transmitted to the telematics server 110 (208). This transmission may take place via one or more of any number of communication protocols (e.g., GSM, CDMA, LTE, one or more IEEE 802.11 standards such as Wi-Fi, WiMAX, BLUETOOTH, etc.). While FIG. 2 describes wireless transmission, this is only exemplary in nature. In other embodiments, for example, the telematics server 110 and the first mobile application 204 on the first telematics device 104 may be connected, at least partially, via a wired connection instead.

In some embodiments, second telematics device 106 also generates telematics data (202b) associated with operation of a vehicle 102 during one or more vehicle trips of the vehicle 102. This telematics data may be generated via sensors 102a on the vehicle 102, via sensors in the telematics device (e.g., sensors 132), via GPS systems, or via other systems or components as described herein for FIGS. 1A and 1B.

In the present embodiment, after the second mobile application 206 on the second telematics device 106 generates telematics data (202b), it is then transmitted to the telematics server 110 (210). This transmission may take place via one or more of any number of communication protocols (e.g., GSM, CDMA, LTE, one or more IEEE 802.11 standards such as Wi-Fi, WiMAX, BLUETOOTH, etc.). While FIG. 2 describes wireless transmission, this is only exemplary in nature. In other embodiments, for example, the telematics server 110 and the first telematics device 106 may be connected, at least partially, via a wired connection instead.

Telematics server 110 receives (e.g., via its external ports and/or communication modules 120 and/or 122) and analyzes the telematics data. Analyzing telematics data may refer to, but is not limited to, generating an indication of whether the first and second users are operating the vehicle 102 as described herein. Analyzing telematics data may further refer to, but is not limited to, otherwise gathering and/or manipulating data, such as by determining start and stop times for a trip, determining geographical position, determining times, or gathering and/or other data or information as described herein. In some embodiments, analyzing telematics data may attach metadata to the telematics data records, or GUI values, where such metadata includes data generated, determined from, or otherwise resulting from the telematics data as received from the first mobile application 204 on the first telematics device 104 and second mobile application 206 on the second telematics device 106.

In the embodiment of FIG. 2, when analysis of telematics data (211), by the telematics server 110, determines that the first user is operating the vehicle 102, the telematics server 110 begins to transmit indications to the first mobile application 204. In various embodiments, the telematics server 110 only begins transmitting indications to first mobile application 204 when a user is determined to be on an extended road trip. In some embodiments, this determination can be when the telematics server 110 determines, from the telematics data, that a trip has reached and/or surpassed a "predetermined trip threshold". Predetermined trip threshold here is defined as: a geographical distance, a chronological difference between travel points, or through any other method as described herein. In other embodiments, this determination can be reached through prompting the user to describe what kind of trip she is currently engaged in.

In other embodiments, the telematics server 110 may determine that the first user is operating the vehicle 102 when the vehicle 102 activates or otherwise changes from its present state. For example, through the telematics data generated at various sensors (such as vehicle sensors 102a or sensors on the telematics device 132), the telematics server may determine that the vehicle 102 has activated or changed state. This determination may be made through determining that the engine has turned on, the wheels have begun turning, or through any other method as described herein.

In some embodiments, the telematics server 110 may create a predicted route for the path along which the vehicle 102 will travel. The telematics server 110 may create this predicted route based upon user-input data regarding current location, user-input data regarding final location, past historical data regarding geographical location, current data based on present geographical location, time of day, current traffic conditions, or any other metric as described herein.

In the embodiment of FIG. 2, the telematics server 110 transmits a first indication that the first user operates the vehicle 102 (212) to the first mobile application 204. This indication causes the first mobile application 204 to begin executing in a driver application mode (214). In some embodiments, the driver application mode may be a first set of instructions of the common program instructions.

In certain embodiments, the driver application mode may change the functioning of the first mobile application 204. In alternate embodiments, the driver application mode may be only a nominative change for the first mobile application 204. The first mobile application 204 may switch in to and out of the driver application mode without the first user's active prompting. In other embodiments, the first mobile application 204 may only switch to and from the driver application mode after prompting from the first user. In yet other embodiments, the first mobile application 204 may be prompted to switch to and from the driver application mode by the second mobile application 206.

In the embodiment of FIG. 2, the telematics server 110 transmits a second indication that the second user does not operate the vehicle 102 (216) to the second mobile application 206. This transmission can happen in various embodiments before, after, or simultaneously with the transmission of the first indication that the first user operates the vehicle 102 (212) to the first mobile application 204. This indication causes the second mobile application 206 to begin executing in a passenger application mode (220). In some embodiments, the passenger application mode may be a second set of instructions of the common program instructions.

The passenger application mode may change the functioning of the second mobile application 206. In alternate embodiments, the passenger application mode may be only a nominative change for the second mobile application 206. The second mobile application 206 may switch in to and out of the passenger application mode without the second user's active prompting. In other embodiments, the second mobile application 206 may only switch to and from the passenger application mode after prompting from the second user. In yet other embodiments, the second mobile application 206 may be prompted to switch to and from the passenger application mode by the first mobile application 204.

In the embodiment of FIG. 2, the telematics server 110 determines that a first user should stop driving. The determination may be made by using telematics data to determine that a user has reached a "driving threshold". Here a driving threshold is defined as a predefined distance, a distance determined based on the user's past driving history, a predefined driving time, a driving time determined based on the user's past driving history, or other metrics as defined herein. A driving threshold may be set by the user, set by the manufacturer, automatically determined based on telematics data, or through any other method as described herein. The determination that a first user should stop driving may also be made by using telematics data to determine that a user has not yet reached, but is approaching a driving threshold. The determination that a first user should stop driving may further be made by otherwise using telematics data as described herein.

In various embodiments, the telematics server may transmit one or more messages (218) to the first mobile application 204. The one or more messages may be transmitted via one or more of any number of communication protocols (e.g., GSM, CDMA, LTE, one or more IEEE 802.11 Standards such as Wi-Fi, WiMAX, BLUETOOTH, etc.). The one or more messages may be sent as an SMS message, a notification to the mobile application, an APPLE iMESSAGE, or any other text-format message as described herein.

In the embodiment of FIG. 2, the telematics server 110 transmits one or more messages (222) to the second mobile application 206. The one or more messages may be transmitted via one or more of any number of communication protocols (e.g., GSM, CDMA, LTE, one or more IEEE 802.11 Standards such as Wi-Fi, WiMAX, BLUETOOTH, etc.). The one or more messages may be sent as an SMS message, a notification to the mobile application, an APPLE iMESSAGE, or any other text-format message as described herein.

In other embodiments, the first mobile application 204 may transmit one or more messages to the second mobile application 206. The one or more messages may be transmitted via one or more of any number of communication protocols (e.g., GSM, CDMA, LTE, one or more IEEE 802.11 Standards such as Wi-Fi, WiMAX, BLUETOOTH, etc.). The one or more messages may be sent as an SMS message, a notification to the mobile application, an APPLE iMESSAGE, or any other text-format message as described herein. The one or more messages sent may be one of the one or more messages sent from the telematics server 110 to the first mobile application 204 (218) or may be generated at first mobile application 204 in response to receiving one or more messages from the telematics server 110.

In the embodiment of FIG. 2, the second mobile application 206 may render the one or more messages (224) on a display of the second telematics device 106. The one or more messages may be rendered in a language depending on the settings of the second mobile application 206. The one or more messages may also be rendered in a language depending on the settings of the second telematics device 106 or as otherwise described herein.

The one or more messages may contain a notification informing the second user to begin driving in place of the first user. The one or more messages may also contain a notification informing the second user of recommendations for locations along the predicted route. The one or more messages may also contain a notification informing the second user of discounts for locations along the predicted route or other information as described herein.

Figure 3A:
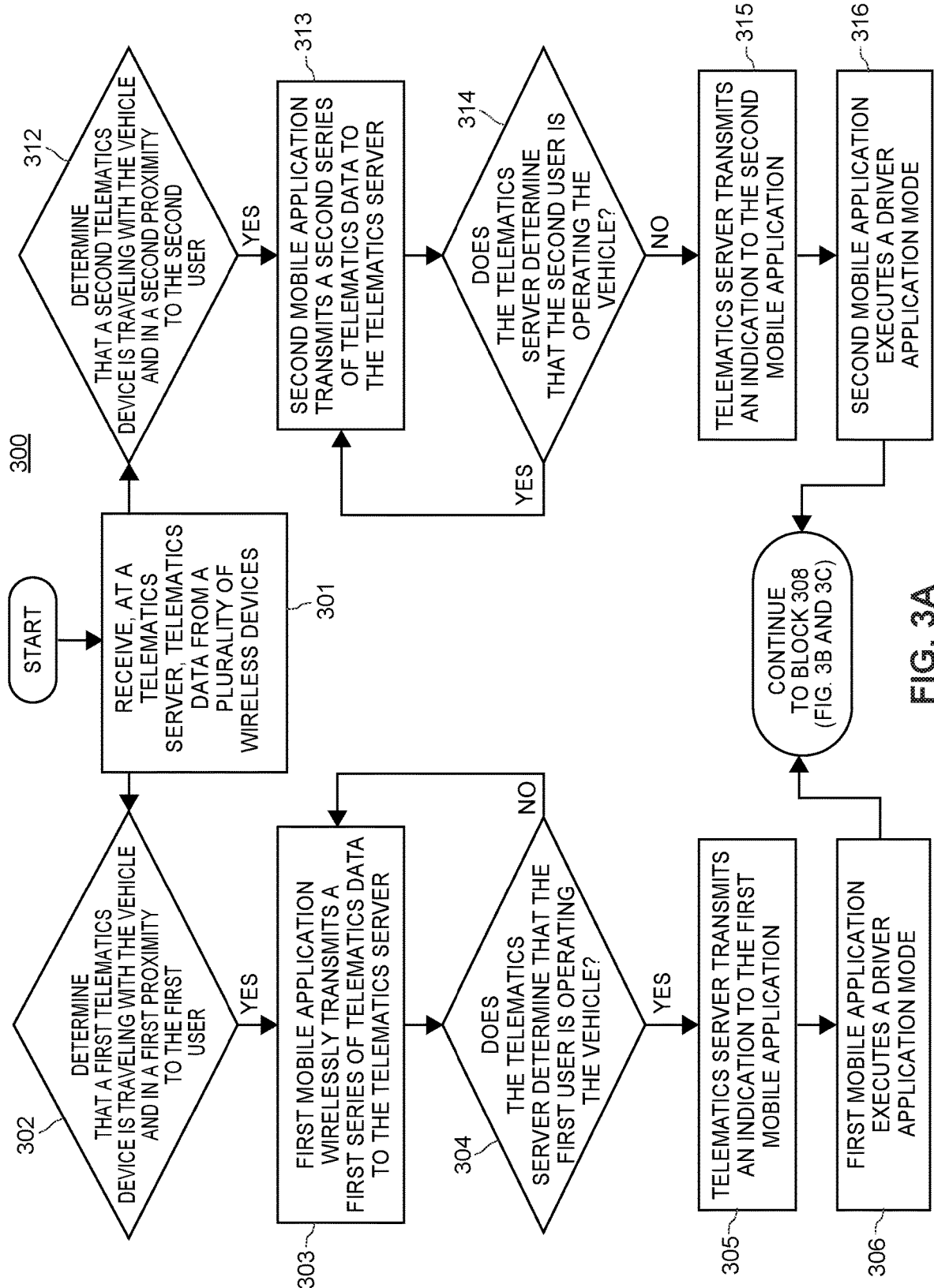
FIG. 3A illustrates a flow diagram of an exemplary configuration for a first mobile application and second mobile application in accordance with various embodiments disclosed herein.

FIG. 3A illustrates a flow diagram for an exemplary configuration for a first mobile application 204 in accordance with various embodiments disclosed herein. Flow diagram 300 may include all, or part, of the computing devices, features, and/or other functionality as described herein for FIGS. 1A and 1B. Accordingly, the disclosure for FIGS. 1A and 1B applies the same or similarly for FIG. 3A. In the embodiment of FIG. 3A, the telematics server 110 receives telematics data from a plurality of wireless devices (block 301). In some embodiments, these wireless devices may include first telematics device 104 and second telematics device 106. In other embodiments, the wireless devices may include sensor(s) 102a.

The telematics server may determine that a first telematics device is traveling with the vehicle 102 and in a first proximity to the first user (block 302). This determination can be made by analyzing data from the first telematics device 104. In various embodiments, this determination may also be made by using the geographical location data from the first telematics device 104. This determination may also be made by using the movement speed of the first telematics device 104. In some embodiments, this determination may be made by using historical telematics data, by data transmitted from sensor(s) 102a to first telematics device 104, or by any other method as described herein.

In various embodiments, the first mobile application 204 wirelessly transmits a first series of telematics data to the telematics server 110 (block 303). The first series of telematics data may be transmitted via one or more of any number of communication protocols (e.g., GSM, CDMA, LTE, one or more IEEE 802.11 Standards such as Wi-Fi, WiMAX, BLUETOOTH, etc.).

The telematics server 110 may make a determination as to whether the first user is operating the vehicle 102 (block 304). If the telematics server determines that the first user is not operating the vehicle 102, then the first mobile application 204 returns to block 303. If the telematics server 110 determines that the first user is operating the vehicle 102, then the first mobile application 204 continues to block 305.

In some embodiments, the telematics server 110 may determine that the first user is operating the vehicle 102 when the vehicle 102 activates or otherwise changes from its present state. For example, through the telematics data generated at various sensors (such as vehicle sensors 102a or sensors on the telematics device 132), the telematics server may determine that the vehicle 102 has activated or changed state. This determination may be made through determining that the engine has turned on, the wheels have begun turning, or through any other method as described herein.

In certain embodiments, the telematics server 110 may create a predicted route for the path along which the vehicle 102 will travel. The telematics server 110 may create this predicted route based upon user-input data regarding current location, user-input data regarding final location, past historical data regarding geographical location, current data based on present geographical location, time of day, current traffic conditions, or any other metric as described herein.

In some embodiments, the telematics server 110 may send an indication that the first user operates the vehicle 102 to the first mobile application 204 (block 305). This indication may be transmitted via one or more of any number of communication protocols (e.g., GSM, CDMA, LTE, one or more IEEE 802.11 Standards such as Wi-Fi, WiMAX, BLUETOOTH, etc.). The first mobile application 204 may execute in a driver application mode (block 306). In some embodiments, the driver mode may be the execution, by a processor of the first telematics device 104, of a first set of instructions of the common program instructions.

In certain embodiments, the driver application mode may change the functioning of the first mobile application 204. In alternate embodiments, the driver application mode may be only a nominative change for the first mobile application 204. The first mobile application 204 may switch in to and out of the driver application mode without the first user's active prompting. In other embodiments, the first mobile application 204 may only switch to and from the driver application mode after prompting from the first user. In yet other embodiments, the first mobile application 204 may be prompted to switch to and from the driver application mode by the second mobile application 206.

FIG. 3A further illustrates a flow diagram for an exemplary configuration for a second mobile application 206 in accordance with various embodiments disclosed herein. The telematics server 110 may determine that a second telematics device 106 is traveling with the vehicle 102 and in a second proximity to a second user (block 312). This determination can be made by analyzing data from the second telematics device 106. In some embodiments, this determination may also be made by using the geographical location data from the second telematics device 106. This determination may also be made by using the movement speed of the second telematics device 106. In some embodiments, this determination may be made by using historical telematics data, by data transmitted from sensor(s) 102a to second telematics device 106, or by any other method as described herein.

In various embodiments, the second mobile application 206 wirelessly transmits a second series of telematics data to the telematics server 110 (block 313). The second series of telematics data may be transmitted via one or more of any number of communication protocols (e.g., GSM, CDMA, LTE, one or more IEEE 802.11 Standards such as Wi-Fi, WiMAX, BLUETOOTH, etc.).

The telematics server 110 may make a determination as to whether the second user is operating the vehicle 102 (block 314). If the telematics server 110 determines that the second user is operating the vehicle 102, then the second mobile application 206 returns to block 313. If the telematics server 110 determines that the second user is not operating the vehicle 102, then the second mobile application 206 continues to block 315.

In some embodiments, the first telematics device 104 or second telematics device 106 may prompt the user to indicate whether a new driver has begun driving. In other embodiments, the telematics server 110 may determine that the second user is operating the vehicle 102 when the vehicle 102 activates or otherwise changes from its present state. For example, through the telematics data generated at various sensors (such as vehicle sensors 102*a* or sensors on the telematics device 132), the telematics server may determine that the vehicle 102 has activated or changed state. This determination may be made through determining that the engine has turned on, the wheels have begun turning, or through any other method as described herein.

In certain embodiments, the telematics server 110 may create a predicted route for the path along which the vehicle 102 will travel. The telematics server 110 may create this predicted route based upon user-input data regarding current location, user-input data regarding final location, past historical data regarding geographical location, current data based on present geographical location, time of day, current traffic conditions, or any other metric as described herein.

In some embodiments, the telematics server 110 may send an indication of the second user operating the vehicle 102 to the second mobile application 206 (block 315). This indication may be transmitted via one or more of any number of communication protocols (e.g., GSM, CDMA, LTE, one or more IEEE 802.11 Standards such as Wi-Fi, WiMAX, BLUETOOTH, etc.). The second mobile application 206 may execute in a passenger application mode. In some embodiments, the passenger application mode may be the execution, by the second telematics device 106, of a second set of instructions of the common program instructions.

The passenger application mode may change the functioning of the second mobile application 206. In alternate embodiments, the passenger application mode may be only a nominative change for the second mobile application 206. The second mobile application 206 may switch in to and out of the passenger application mode without the second user's active prompting. In other embodiments, the second mobile application 206 may only switch to and from the passenger application mode after prompting from the second user. In yet other embodiments, the second mobile application 206 may be prompted to switch to and from the passenger application mode by the first mobile application 204.

Figure 3B:
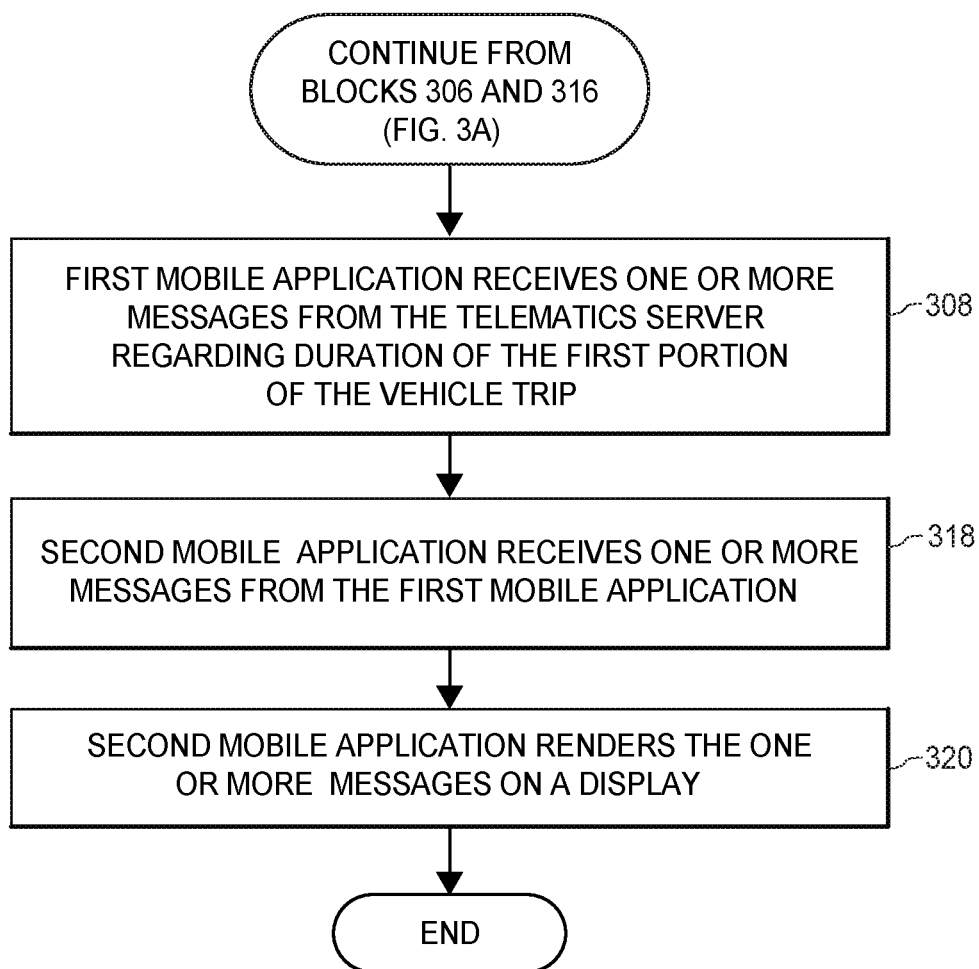
FIG. 3B illustrates an embodiment of a continued portion of the flow diagram of FIG. 3A in accordance with various embodiments disclosed herein.

FIG. 3B illustrates an embodiment of a continued portion of the flow diagram of FIG. 3A in accordance with various embodiments disclosed herein. Flow diagram 300 may include all, or part, of the computing devices, features, and/or other functionality as described herein for FIGS. 1A and 1B. Accordingly, the disclosure for FIGS. 1A and 1B applies the same or similarly for FIG. 3B. In the embodiment of FIG. 3B, the first mobile application 204 receives one or more messages from the telematics server 110 regarding duration of the first portion of the vehicle trip (block 308). The one or more messages may be transmitted via one or more of any number of communication protocols (e.g., GSM, CDMA, LTE, one or more IEEE 802.11 Standards such as Wi-Fi, WiMAX, BLUETOOTH, etc.). The one or more messages may be sent as an SMS message, a notification to the mobile application, an APPLE iMESSAGE, or any other text-format message as described herein.

The one or more messages may contain a notification informing the first user to allow a second user to drive. The one or more messages may also contain a notification informing the first user of recommendations for locations along the predicted route. The one or more messages may also contain a notification informing the first user of discounts for locations along the predicted route, or of other information as described herein.

In the embodiment of FIG. 3B, the second mobile application 206 receives one or more messages from the first mobile application 204 (block 318). It should be noted that, although FIG. 3B depicts them happening sequentially, blocks 308 and 318 may occur sequentially in any order or in parallel. The one or more messages may be transmitted via one or more of any number of communication protocols (e.g., GSM, CDMA, LTE, one or more IEEE 802.11 Standards such as Wi-Fi, WiMAX, BLUETOOTH, etc.). The one or more messages may be sent as an SMS message, a notification to the mobile application, an APPLE iMESSAGE, or any other text-format message as described herein.

In other embodiments, the second mobile application 206 may receive one or more messages from the telematics server 110. The one or more messages may be transmitted via one or more of any number of communication protocols (e.g., GSM, CDMA, LTE, one or more IEEE 802.11 Standards such as Wi-Fi, WiMAX, BLUETOOTH, etc.). The one or more messages may be sent as an SMS message, a notification to the mobile application, an APPLE iMESSAGE, or any other text-format message as described herein.

The one or more messages may contain a notification informing the first user to allow a second user to drive. The one or more messages may also contain a notification informing the first user of recommendations for locations along the predicted route. The one or more messages may also contain a notification informing the first user of discounts for locations along the predicted route, or of other information as described herein.

The second mobile application 206 may render the one or more messages on a display of the second telematics device 320. The one or more messages may be rendered in a language depending on the settings of the second mobile application 206. The one or more messages may also be rendered in a language depending on the settings of the second telematics device 106, or as otherwise described herein.

Figure 3C:
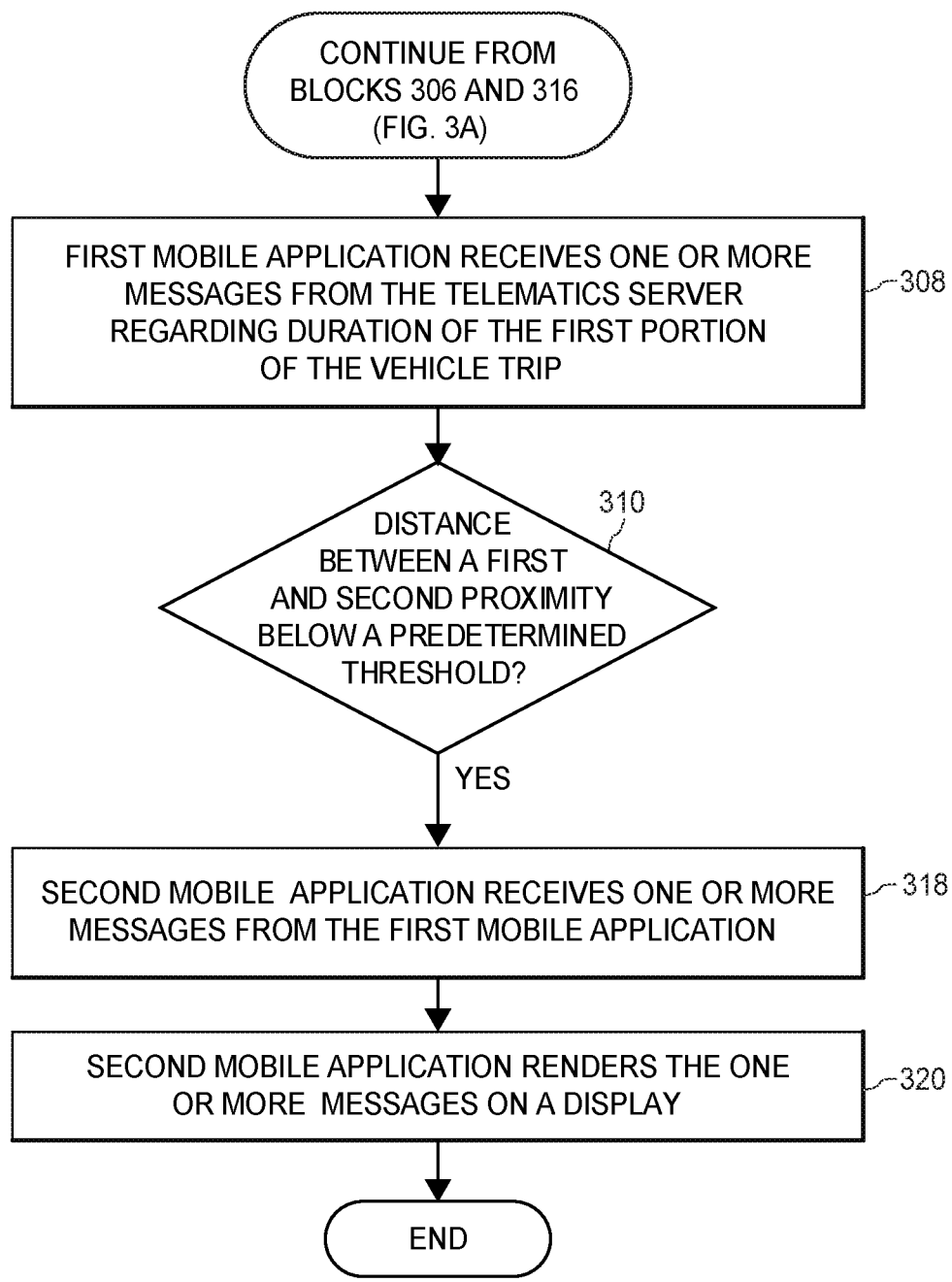
FIG. 3C illustrates an additional embodiment of a continued portion of the flow diagram of FIG. 3A in accordance with various embodiments disclosed herein.

FIG. 3C illustrates an additional embodiment of a continued portion of the flow diagram of FIG. 3A in accordance with various embodiments disclosed herein. Flow diagram 300 may include all, or part, of the computing devices, features, and/or other functionality as described herein for FIGS. 1A and 1B. Accordingly, the disclosure for FIGS. 1A and 1B applies the same or similarly for FIG. 3C. In the embodiment of FIG. 3C, the first mobile application 204 on the first telematics device 104 executes in a driver application mode. Further, in the embodiment of FIG. 3C, the second mobile application 206 on the second telematics device 106 executes in a passenger application mode.

In the embodiment of FIG. 3C, the first mobile application 204 receives one or more messages from the telematics server 110 regarding duration of the first portion of the vehicle trip (block 308). The one or more messages may be transmitted via one or more of any number of communication protocols (e.g., GSM, CDMA, LTE, one or more IEEE 802.11 Standards such as Wi-Fi, WiMAX, BLUETOOTH, etc.). The one or more messages may be sent as an SMS message, a notification to the mobile application, an APPLE iMESSAGE, or any other text-format message as described herein.

The one or more messages may contain a notification informing the first user to allow a second user to drive. The one or more messages may also contain a notification informing the first user of recommendations for locations along the predicted route. The one or more messages may also contain a notification informing the first user of discounts for locations along the predicted route, or other information as described herein.

In some embodiments, the telematics server 110 determines whether the distance between a first and second proximity of a first and second user is below a predetermined threshold (block 310). This determination can be made by analyzing data from the first telematics device 104 and second telematics device 106. This determination may be made by using the geographical location data from the first telematics device 104 and second telematics device 106. This determination may also be made by using the movement speed of the first telematics device 104 and second telematics device 106. In some embodiments, this determination may be made by using historical telematics data or other data as described herein.

If the telematics server 110 determines that the distance between a first and second proximity of a first and second user is below a predetermined threshold, then the first mobile application 204 on the first telematics device 104 wirelessly transmits the one or more messages to the second mobile application 206 on the second telematics device 106.

In the embodiment of FIG. 3C, the second mobile application 206 receives one or more messages from the first mobile application 204 (block 318). The one or more messages may be transmitted via one or more of any number of communication protocols (e.g., GSM, CDMA, LTE, one or more IEEE 802.11 Standards such as Wi-Fi, WiMAX, BLUETOOTH, etc.). The one or more messages may be sent as an SMS message, a notification to the mobile application, an APPLE iMESSAGE, or any other text-format message as described herein.

In other embodiments, the second mobile application 206 may receive one or more messages from the telematics server 110. The one or more messages may be transmitted via one or more of any number of communication protocols (e.g., GSM, CDMA, LTE, one or more IEEE 802.11 Standards such as Wi-Fi, WiMAX, BLUETOOTH, etc.). The one or more messages may be sent as an SMS message, a notification to the mobile application, an APPLE iMESSAGE, or any other text-format message as described herein.

The one or more messages may contain a notification informing the first user to allow a second user to drive. The one or more messages may also contain a notification informing the first user of recommendations for locations along the predicted route. The one or more messages may also contain a notification informing the first user of discounts for locations along the predicted route, or other information as described herein.

The second mobile application 206 may render the one or more messages on a display of the second telematics device 106 (block 320). The one or more messages may be rendered in a language depending on the settings of the second mobile application. The one or more messages may also be rendered in a language depending on the settings of the second telematics device 106, or as otherwise described herein.

Figure 4:
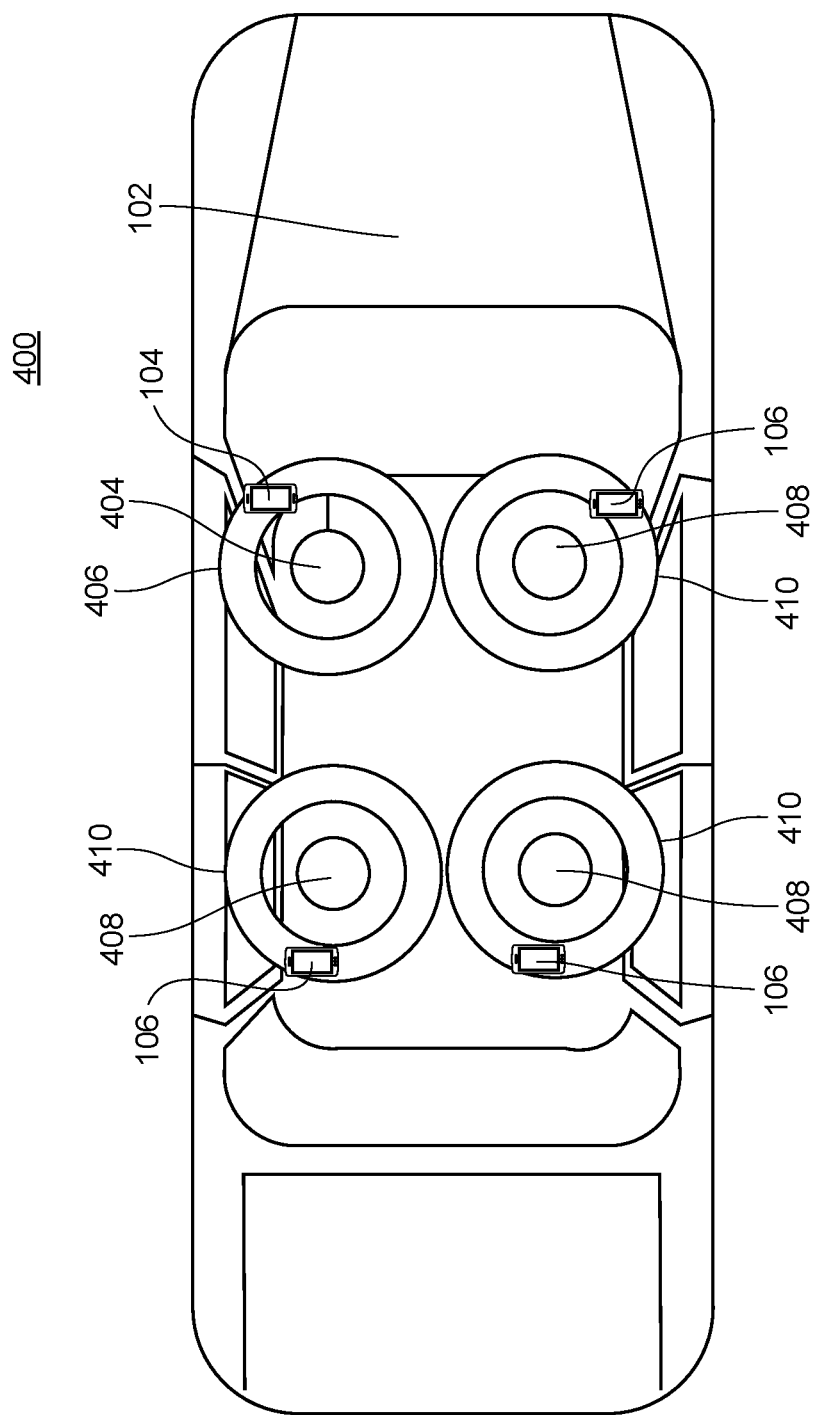
FIG. 4 illustrates a vehicle, as well as a first user, a first telematics device, a first proximity, and a plurality of other users, other telematics devices, and other proximities in accordance with various embodiments disclosed herein.

FIG. 4 represents an embodiment 400 of a vehicle 102, as well as a first user 404, a first telematics device 104, a first proximity 406, and a plurality of other users 408, other telematics devices 106, and other proximities 410 in accordance with various embodiments disclosed herein. Embodiment 400 may include all, or part, of the computing devices, features, and/or other functionality as described herein for FIGS. 1A and 1B. Accordingly, the disclosure for FIGS. 1A and 1B applies the same or similarly for FIG. 4. In various embodiments, the telematics system 110 determines the number of potential drivers by determining that the distance of the second proximity 410 of the second user 408 to the first proximity 406 of the first user 404 is below a predetermined threshold. This threshold can be determined by a number of different methods, such as allowing a first user 404 to define the size of vehicle 102, prompting a first user 404 to input the make and model of a vehicle 102, prompting a first user 404 to input the type of vehicle 102 (e.g., sports car, truck, motorcycle, etc.), or other methods as described herein.

Other embodiments instead prompt a first user 404 to input the number of other capable drivers. In yet more embodiments, the first telematics device 104 wirelessly communicates with other telematics devices 106 to determine what vehicle other users 408 are in. In another embodiment, the first telematics device 104 wirelessly communicates with other telematics devices 106 to determine what speed the other telematics devices 106 are moving at.

In some embodiments, the telematics server 110 may determine whether the distance between a first proximity 406 and a second proximity 410 of a first user 404 and a number of potential other users 408 is below the predetermined threshold by prompting the first user 404 to input the number of other users 408 that possess a telematics device 106 with another mobile application 206. The telematics server 110 may also make this determination by prompting the first user 404 to input the number of other users 408 capable of driving. In other embodiments, the first mobile application 204 may wirelessly transmit a signal within the first proximity 406. Any other mobile applications 206 that receive the signal may wirelessly transmit a signal back to the first mobile application 204, indicating that other telematics devices 106 with the mobile application 206 are present within the vehicle 102. This signal may be transmitted via one or more of any number of communication protocols (e.g., GSM, CDMA, LTE, one or more IEEE 802.11 Standards such as Wi-Fi, WiMAX, BLUETOOTH, etc.).

The first proximity 406 may extend around the first user 404 to varying lengths. In some embodiments, the first proximity 406 encompasses the entire vehicle 102. In other embodiments, the first proximity 406 is limited to a small area surrounding the first user 404. In this first proximity 406, the first mobile telematics device 104 travels with the first user 404 in the vehicle 102.

The second proximity 410 may extend around the second user 408 to varying lengths. In some embodiments, the second proximity 410 encompasses the entire vehicle 102. In other embodiments, the second proximity 410 is limited to a small area surrounding the second user 408. In this second proximity 410, the second mobile telematics device 106 travels with the second user 408 in the vehicle 102.

Though FIG. 4 details only one first proximity 406 and three other proximities 410, it should be appreciated that a plurality of proximities 406 and 410 may be used in various embodiments. Similarly, though the above describes behavior for a first proximity 406 and a second proximity 410, any number of other proximities 410 may exist similarly to the second proximity 410. It should be further appreciated that, even though the disclosure above only details a first and second user 404/408, any number of additional users 408 beyond the first and second may be present in various embodiments.

In some embodiments, the first user 404 may leave the vehicle 102 while other users 408 may stay, or vice versa. In such embodiments, the first mobile application 204 on first telematics device 104 may no longer consider other users 408 as potential drivers. In other embodiments, the first mobile application 204 on first telematics device 104 may retain the other users 408 as potential drivers for a period of time before removing them. In still yet other embodiments, the first mobile application 204 on first telematics device 104 may determine that a user 408 entering the first proximity 406 and quickly exiting the first proximity 406 may just be driving or walking close to the vehicle 102, and thus is not added to the list of potential drivers.

Figure 5:
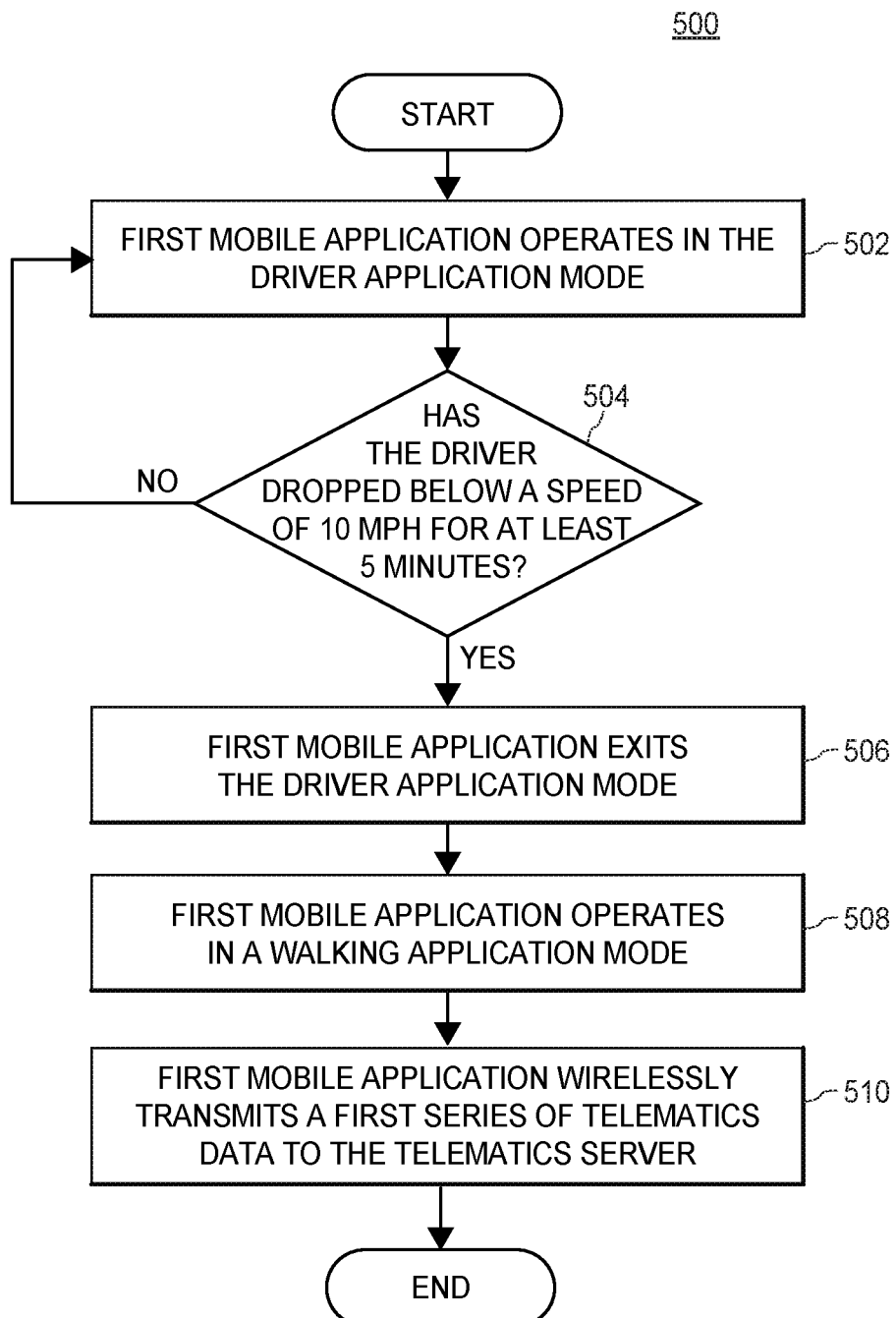
FIG. 5 illustrates a flow diagram detailing an exemplary configuration for a first mobile application's driver application mode in accordance with various embodiments disclosed herein.

FIG. 5 illustrates a flow diagram 500 of an exemplary configuration of a first mobile application 204 driver application mode in accordance with various embodiments disclosed herein. Flow diagram 500 may include all, or part, of the computing devices, features, and/or other functionality as described herein for FIGS. 1A and 1B. Accordingly, the disclosure for FIGS. 1A and 1B applies the same or similarly for FIG. 5. In some embodiments, the first mobile application 204 may execute in a driver application mode (block 502). In some embodiments, the driver mode may be a first set of instructions of the common program instructions.

The driver application mode may change the functioning of the first mobile application 204. In alternate embodiments, the driver application mode may be only a nominative change for the first mobile application 204. The first mobile application 204 may switch in to and out of the driver application mode without the first user's active prompting. In other embodiments, the first mobile application 204 may only switch to and from the driver application mode after prompting from the first user. In yet other embodiments, the first mobile application 204 may be prompted to switch to and from the driver application mode by the second mobile application 206.

In the embodiment of FIG. 5, the first telematics device 104 determines whether the driver has dropped below a speed of 10 miles per hour for at least 5 minutes (block 504). The first telematics device 104 may make this determination based on the telematics data generated by sensors 132 on the device 104. The first telematics device 104 may, in some embodiments, make this determination based on the telematics data generated by sensors 102a on the vehicle 102, transmitted to the first telematics device 104. This signal may be transmitted via one or more of any number of communication protocols (e.g., GSM, CDMA, LTE, one or more IEEE 802.11 Standards such as Wi-Fi, WiMAX, BLUETOOTH, etc.). In the embodiment of FIG. 5, when the first telematics device 104 determines that the driver has dropped below a speed of 10 miles per hour for at least 5 minutes, the first mobile application 204 exits the driver application mode (block 506).

In some embodiments, the first mobile application 204 then enters a walking application mode (block 508). The walking application mode may change the functioning of the first mobile application 204. In alternate embodiments, the walking application mode may be only a nominative change for the first mobile application 204. The first mobile application 204 may switch in to and out of the walking application mode without the first user's active prompting. In other embodiments, the first mobile application 204 may only switch to and from the walking application mode after prompting from the first user. In yet other embodiments, the first mobile application 204 may be prompted to switch to and from the walking application mode by the second mobile application 206.

The walking application mode may cause the first mobile application 204 on the first telematics device 104 to begin gathering data related to an individual rather than to a vehicle 102. This data may include information such as a user's stride length, the ambient temperature, ambient moisture, user's physical location (e.g., the user is currently in a restaurant), or other information as described herein.

It should be realized that, though FIG. 5 describes a threshold speed of 10 mph for 5 minutes, the precise values are merely exemplary in nature. Any speed sufficiently low as to indicate that a user has exited a vehicle 102 and begun walking or any other metric for such may be utilized as disclosed herein.

In some embodiments, the first mobile application 204 may wirelessly transmit a first series of telematics data to the telematics server 110 after exiting the driver application mode (block 510). In other embodiments, the first mobile application 204 may wirelessly transmit a first series of telematics data to the telematics server 110 after the second mobile application 206 exits the passenger application mode (not shown). The first series of telematics data may be transmitted via one or more of any number of communication protocols (e.g., GSM, CDMA, LTE, one or more IEEE 802.11 Standards such as Wi-Fi, WiMAX, BLUETOOTH, etc.).

Figure 6A:
FIG. 6A illustrates an example embodiment of two messages rendered on a second telematics device display in accordance with various embodiments disclosed herein.
Figure 6B:
FIG. 6B illustrates an additional example embodiment of two messages rendered on a second telematics device display in accordance with various embodiments disclosed herein.

FIGS. 6A and 6B illustrate two example embodiments 600a/600b of two messages 604 each rendered on a second telematics device 106 display in accordance with various embodiments disclosed herein. In the embodiment of FIG. 6A, the one or more messages 604 are displayed on the display of the second telematics device 106. The one or more messages 604 may include information on a recommendation 606 or a discount 608 associated with predicted locations along a predicted route of the vehicle trip. The one or more messages 604 may also include a notification suggesting the first user pull over and allow another user to take over driving.

In the embodiment of FIG. 6B, the notification suggesting the first user pull over and allow another user to take over driving 610 may include a time by which the first user should pull over 611. The time suggested 611 may be calculated by one of several metrics, including but not limited to past user history, user input information, a predetermined threshold, or any other potential metric as described herein.

In certain embodiments, the recommendation 606 included in the one or more messages 604 may be taken from a list of preinstalled locations. The recommendation 606 may also be chosen from a user-input list of preferred locations. The recommendation 606 may also be chosen based on available discounts, or on other metrics as described herein.

As an exemplary embodiment, the recommendation 606 included in the one or more messages 604 may also be determined based on user-indicated preferences. The user may, for example, indicate before driving that she wishes to only be given notifications for restaurants of a certain variety (Italian, Chinese, Cheap Food, Fast Service, etc.). The second mobile application 206 on the second telematics device 106 or the telematics server 110 as described in FIG. 1A herein may then access information on the surrounding area or predicted route of the vehicle trip and compile a list of restaurants that meet the user's requirements. The telematics server 110 may then wirelessly transmit the information to the second mobile application 206 on the second telematics device 106. The second mobile application 206 on the second telematics device 106 may then sort the list by a given metric (distance, available discounts, user ratings, etc.) before displaying the top option as part of the one or more messages 604 on the display of the second telematics device 106.

In some embodiments, the driver may input preferences into a first mobile application 204 on a first telematics device 104 as described in FIG. 1A herein. The first mobile application 204 may then wirelessly transmit any recommendations 606 to a second mobile application 206 on a second telematics device 106. This data may be transmitted via one or more of any number of communication protocols (e.g., GSM, CDMA, LTE, one or more IEEE 802.11 Standards such as Wi-Fi, WiMAX, BLUETOOTH, etc.). The second mobile application 206 on a second telematics device 106 as described in FIG. 1A herein may display a list of potential locations for rest stops in the surrounding area or along a predicted route of the vehicle trip. These may be sorted and categorized by any number of methods, including but not limited to food type, price, average wait time, distance, and any other metric as described herein.

In some embodiments, the recommendation 606 is based in part on the time of day when driving. For example, if the one or more messages 604 is generated at noon, the recommendation 606 may be for a nearby restaurant that serves lunch. If the one or more messages 604 is generated later in the evening, though, the recommendation 606 may instead be for a nearby hotel or motel with open rooms. The user may be able to customize the parameters by manually selecting categories of recommendations she would like to see at various times. For example, the user may be able to select one or more categories for preset blocks of times, such as allowing notifications for restaurants and tourist hotspots during a predetermined "lunch time". Alternatively, the user may also be able to select time periods for which the second mobile application 206 on the second telematics device 106 may show notifications for various categories, such as only allowing lunch restaurant notifications to show from 10:30 am to 1:00 pm. Alternatively, the user may also be able to fully customize both categories, such as selecting to show both lunch restaurants and tourist hotspots from 10:30 am to 2:00 pm. In some embodiments, the user may be required to select at least one type of notification for all hours of the day.

In certain embodiments, the recommendation 606 is based in part on reviews of locations along the predicted route of the vehicle trip. The telematics server 110 as described in FIG. 1A herein may aggregate reviews from outside sources (such as GOOGLE, YELP, etc.) in determining a location's score. Alternatively or in addition to this, the telematics server 110 may make use of an internal rating system by other users of the application. After a user has stopped at and subsequently left a recommended location 606, the second mobile application 206 on the second telematics device 106 may prompt the first user to rate the establishment. The telematics server 110 may collect and aggregate these ratings in a database for the purpose of determining what locations to recommend to users. Alternatively, the telematics server 110 may keep individual users' ratings to determine what sorts of locations to recommend in the future. Alternatively, the telematics server 110 may use past history data of the user to determine what locations to recommend in the future. This may be via machine learning or otherwise training the telematics server 110 with available data.

In some embodiments, the telematics server 110 and/or a telematics device (e.g., first telematics device 104 or second telematics device 106) may aggregate publicly available information to determine which discounts 608 and/or messages (e.g., messages 604) to display. Alternatively or in addition, the telematics server 110 and/or a telematics device (e.g., first telematics device 104 or second telematics device 106) may display exclusive discounts to the user or unique messages based on the user's known information (e.g., from a user profile). In still other embodiments, the telematics server 110 and/or a telematics device (e.g., first telematics device 104 or second telematics device 106) may employ machine learning techniques or models to determine which discounts or level of discounts are likely to be accepted by the user, or which messages to display and/or at what times. Such machine learning models may be trained using a supervised or unsupervised machine learning program or algorithm. The machine learning program or algorithm may employ a neural network, which may be a convolutional neural network, a deep learning neural network, or a combined learning module or program that learns in two or more features or feature datasets in a particular areas of interest. The machine learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques. Machine learning may involve identifying and recognizing patterns in existing data (such as the type or quantity of accepted discounts as determined from the telematics data of a current or previous trip and/or the types of messages to display for or at certain points, segments, or durations of the trim) in order to facilitate making predictions for subsequent data (to predict whether a driver will be incentivized by a particular discount offer in a future or present trip and/or to determine what messages would be most effective and/or beneficial, e.g., from the perspective of the driver or passenger, as tailored for the driver or passenger, for the particular tip).

Machine learning model(s), such as those of message system 600, may be created and trained based upon example (e.g., "training data,") inputs or data (which may be termed "features" and "labels") in order to make valid and reliable predictions for new inputs, such as testing level or production level data or inputs. In supervised machine learning, a machine learning program operating on a server, computing device, or otherwise processor(s), may be provided with example inputs (e.g., "features") and their associated, or observed, outputs (e.g., "labels") in order for the machine learning program or algorithm to determine or discover rules, relationships, or otherwise machine learning "models" that map such inputs (e.g., "features") to the outputs (e.g., labels), for example, by determining and/or assigning weights or other metrics to the model across its various feature categories. Such rules, relationships, or other such models may then be provided subsequent inputs in order for the model, executing on the server, computing device, or other such processor(s), to predict, based on the discovered rules, relationships, or model, an expected output.

In unsupervised machine learning, the server, computing device, or other such processor(s), may be required to find its own structure in unlabeled example inputs, where, for example multiple training iterations are executed by the server, computing device, or other such processor(s) to train multiple generations of models until a satisfactory model, e.g., a model that provides sufficient prediction accuracy when given test level or production level data or inputs, is generated. The disclosures herein may use one or both of such supervised or unsupervised machine learning techniques. Machine learning models may be compiled, trained, or otherwise generated with artificial intelligence software, including, for example Google Tensorflow or Microsoft Cognitive Toolkit.

In alternative embodiments, discount 608 may instead refer to changes in one's insurance plan premium. For example, a user may be notified that pulling over and allowing another driver to take over may result in an exemplary 5% discount to her insurance premium. In certain embodiments, discount 608 may be applied to a user's insurance premium in real time or at the conclusion of the extended road trip.

With the foregoing, a user of the above telematics systems and methods who is an insurance customer or user may opt-in to rewards, insurance discount, or other type of program. After the insurance customer provides their permission or affirmative consent, an insurance provider telematics application and/or remote server may collect telematics and/or other data (including image or audio data) associated with insured assets, including before, during, and/or after an insurance-related event or vehicle accident, such as any event, etc., as may be determined from the vehicular telematics data, GUI values, environment data, vehicle status data, or other information or data as described herein. In return, risk adverse drivers, and/or vehicle owners may receive discounts or insurance cost savings related to auto, home, life, and other types of insurance from the insurance provider.

In one aspect, telematics data, and/or other data, including the types of data discussed elsewhere herein, may be collected or received by an insured's mobile device or smart vehicle, a mobile application running thereon, and/or an insurance provider remote server, such as via direct or indirect wireless communication or data transmission from a mobile application running on the insured's mobile device or smart vehicle, after the insured or customer affirmatively consents or otherwise opts-in to an insurance discount, reward, or other program. The insurance provider may then analyze the data received with the customer's permission to provide benefits to the customer. As a result, risk adverse customers may receive insurance discounts or other insurance cost savings based upon data that reflects low risk driving behavior and/or technology that mitigates or prevents risk to (i) insured assets, such as vehicles or even homes, and/or (ii) vehicle operators or passengers.

Additional aspects include a telematics server receiving telematics data and/or geographic location data from a large number of mobile computing devices (e.g., 100 or more), and issuing alerts to those mobile computing devices in which the alerts are relevant in accordance with the various techniques described herein.

Although the disclosure herein sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

This detailed description is to be construed as exemplary only and does not describe every possible embodiment, as describing every possible embodiment would be impractical, if not impossible. A person of ordinary skill in the art may implement numerous alternate embodiments, using either current technology or technology developed after the filing date of this application.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed:

1. A telematics server comprising:
   one or more memories comprising instructions stored thereon; and
   one or more processors configured to execute the instructions and perform operations comprising:
      receiving, from a first device of a first user, a first series of telematics data;
      generating one or more messages regarding a first duration of a first portion of a vehicle trip of a vehicle based upon the first series of telematics data; and
      transmitting, to a second device of a second user, the one or more messages;
      wherein at least one message of the one or more messages causes a display of the second device to display an electronic notification indicating that the second user should operate the vehicle during a second portion of the vehicle trip.

2. The telematics server of claim 1, wherein the first device is configured to run a first mobile application and the second device is configured to run a second mobile application, wherein the operations further comprise:
   determining, based on the first series of telematics data, that the first user operates the vehicle during a first portion of the vehicle trip; and
   transmitting, to the first device, a first indication that the first user operates the vehicle, the first indication causing the first mobile application to execute in a driver application mode.

3. The telematics server of claim 2, wherein the operations further comprise:
   determining, based on a second series of telematics data received from the second device, that the second user does not operate the vehicle during the first portion of the vehicle trip; and
   transmitting, to the second device, a second indication that the second user does not operate the vehicle, the second indication causing the second mobile application to execute in a passenger application mode.

4. The telematics server of claim 2, wherein the first mobile application is configured to wirelessly transmit the first series of telematics data to the telematics server after exiting the driver application mode.

5. The telematics server of claim 2, wherein the first mobile application is configured to exit the driver application mode after a speed associated with the first device is determined to be below a threshold value for at least a predetermined period.

6. The telematics server of claim 1, wherein the vehicle is determined to be engaged in an extended period of travel when a predetermined trip threshold is reached.

7. The telematics server of claim 1, wherein at least one message of the one or more messages causes the display of the second device to display a recommendation or a discount associated with a predicted location along a predicted route of the vehicle trip.

8. A telematics method comprising:
   receiving, from a first device of a first user, a first series of telematics data;
   generating one or more messages regarding a first duration of a first portion of a vehicle trip of a vehicle based upon the first series of telematics data; and
   transmitting, to a second device of a second user, the one or more messages;
   wherein at least one message of the one or more messages causes a display of the second device to display an electronic notification indicating that the second user should operate the vehicle during a second portion of the vehicle trip.

9. The telematics method of claim 8, wherein the first device is configured to run a first mobile application and the second device is configured to run a second mobile application, wherein the operations further comprise:
   determining, based on the first series of telematics data, that the first user operates the vehicle during a first portion of the vehicle trip; and
   transmitting, to the first device, a first indication that the first user operates the vehicle, the first indication causing the first mobile application to execute in a driver application mode.

10. The telematics method of claim 9, further comprising:
  determining, based on a second series of telematics data received from the second device, that the second user does not operate the vehicle during the first portion of the vehicle trip; and
  transmitting, to the second device, a second indication that the second user does not operate the vehicle, the second indication causing the second mobile application to execute in a passenger application mode.

11. The telematics method of claim 9, wherein the first mobile application is configured to wirelessly transmit the first series of telematics data to the telematics server after exiting the driver application mode.

12. The telematics method of claim 9, wherein the first mobile application is configured to exit the driver application mode after a speed associated with the first device is determined to be below a threshold value for at least a predetermined period.

13. The telematics method of claim 8, wherein the vehicle is determined to be engaged in an extended period of travel when a predetermined trip threshold is reached.

14. The telematics method of claim 8, wherein at least one message of the one or more messages causes the display of the second device to display a recommendation or discount associated with predicted locations along a predicted route of the vehicle trip.

15. A non-transitory computer-readable medium storing instructions that, when executed by one or more processors of a computing device, cause the computing device to:
  receive, from the first device, a first series of telematics data;
  generate one or more messages regarding a first duration of a first portion of a vehicle trip of a vehicle based upon the first series of telematics data; and
  transmit, to the second device, the one or more messages;
  wherein at least one message of the one or more messages causes a display of the second device to display an electronic notification indicating that the second user should operate the vehicle during a second portion of the vehicle trip.

16. The computer-readable medium of claim 15, wherein the first device is configured to run a first mobile application and the second device is configured to run a second mobile application, wherein the instructions further cause the computing device to:
  determine, based on the first series of telematics data, that the first user operates the vehicle during a first portion of the vehicle trip; and
  transmit, to the first device, a first indication that the first user operates the vehicle, the first indication causing the first mobile application to execute in a driver application mode.

17. The computer-readable medium of claim 16, wherein the instructions further cause the computing device to:
  determining, based on a second series of telematics data received from the second device, that the second user does not operate the vehicle during the first portion of the vehicle trip; and
  transmitting, to the second device, a second indication that the second user does not operate the vehicle, the second indication causing the second mobile application to execute in a passenger application mode.

18. The computer-readable medium of claim 16, wherein the first mobile application is configured to transmit the first series of telematics data after exiting the driver application mode.

19. The computer-readable medium of claim 16, wherein the first mobile application is configured to exit the driver application mode after a speed associated with the first device is determined to be below a threshold value for at least a predetermined period.

20. The computer-readable medium of claim 15, wherein at least one message of the one or more messages causes the display of the second device to display an estimated time at which the second user should allow the first user to resume operation of the vehicle during a third portion of the vehicle trip.

* * * * *